United States Patent
Jenkins et al.

(10) Patent No.: US 9,834,375 B2
(45) Date of Patent: Dec. 5, 2017

(54) WASTE MANAGEMENT DEPOSIT AND COMPACTION STATION WITH WIRELESS CAPABILITY

(71) Applicants: Grant Jenkins, Carmel, IN (US); Terrill Krigger, Indianapolis, IN (US)

(72) Inventors: Grant Jenkins, Carmel, IN (US); Terrill Krigger, Indianapolis, IN (US)

(73) Assignee: ICAN LLC, Carmel, IN (US)

( * ) Notice: Subject to any disclaimer, the term of this patent is extended or adjusted under 35 U.S.C. 154(b) by 55 days.

(21) Appl. No.: 14/768,471

(22) PCT Filed: Feb. 25, 2015

(86) PCT No.: PCT/US2015/017455
§ 371 (c)(1),
(2) Date: Aug. 18, 2015

(87) PCT Pub. No.: WO2015/130747
PCT Pub. Date: Sep. 3, 2015

(65) Prior Publication Data
US 2016/0272419 A1    Sep. 22, 2016

Related U.S. Application Data

(60) Provisional application No. 61/944,281, filed on Feb. 25, 2014.

(51) Int. Cl.
*H02J 7/00* (2006.01)
*B65F 1/14* (2006.01)
(Continued)

(52) U.S. Cl.
CPC .............. *B65F 1/1405* (2013.01); *B65F 1/10* (2013.01); *B65F 1/1426* (2013.01); *B65F 1/163* (2013.01);
(Continued)

(58) Field of Classification Search
CPC ....................................................... H02J 7/35
(Continued)

(56) References Cited

U.S. PATENT DOCUMENTS

| 4,147,100 A | 4/1979 | Dykstra |
| 4,827,645 A | 5/1989 | Dtamps, Jr. |

(Continued)

FOREIGN PATENT DOCUMENTS

| KR | 10-0787115 B1 | 12/2007 |
| KR | 10-2013-0071316 A | 6/2013 |

OTHER PUBLICATIONS

"International Search Report" and "Written Opinion"; dated May 27, 2015; 8 pages; Completed by the Korean Intellectual Property Office.

*Primary Examiner* — Yalkew Fantu
(74) *Attorney, Agent, or Firm* — Taft Stettinius & Hollister LLP; Stephen F. Rost

(57) ABSTRACT

A multipurpose refuse receptacle comprising an outer shell defining an inner chamber, a receiving assembly disposed within the inner chamber, and a door assembly. The door assembly is movable between an open position and a close position. The receptacle has a basket carrier and a basket, the basket being disposable within the basket carrier. Further, a hydraulic lift assembly is operably coupled to the basket carrier, the hydraulic lift assembly having a pump assembly. A mechanism is operably coupled to the pump assembly and the door assembly, the mechanism being movable in a first direction. Wherein, when the mechanism is moved in the first direction the door assembly moves to the open position. Further wherein, when the mechanism is moved in the first direction, hydraulic pressure is generated by the pump assembly.

9 Claims, 30 Drawing Sheets

(51) Int. Cl.
    *B65F 1/10*                  (2006.01)
    *H02J 7/35*                 (2006.01)
    *B65F 1/16*                 (2006.01)

(52) U.S. Cl.
    CPC ............... *H02J 7/35* (2013.01); *B65F 1/1623* (2013.01); *B65F 2210/128* (2013.01); *B65F 2210/148* (2013.01); *B65F 2210/1443* (2013.01); *B65F 2210/162* (2013.01); *B65F 2210/168* (2013.01); *B65F 2210/172* (2013.01)

(58) Field of Classification Search
    USPC ........................................................ 320/101
    See application file for complete search history.

(56) References Cited

U.S. PATENT DOCUMENTS

| | | | |
|---|---|---|---|
| 4,991,913 A | 2/1991 | Van Wilder et al. | |
| 5,163,574 A | 11/1992 | Sosan | |
| 5,713,270 A | 2/1998 | Fitzgerald et al. | |
| 6,021,712 A * | 2/2000 | Harrop | B30B 9/3007 |
| | | | 100/229 A |
| 6,367,377 B1 | 4/2002 | Gawley et al. | |
| 6,863,827 B2 | 3/2005 | Saraceno | |
| 7,007,598 B1 | 3/2006 | Patras | |
| 7,124,680 B2 | 10/2006 | Poss et al. | |
| 7,256,694 B2 | 8/2007 | Papari et al. | |
| 7,481,159 B2 | 1/2009 | Poss et al. | |
| 7,735,334 B2 | 6/2010 | Johnson | |
| 7,819,054 B2 * | 10/2010 | Cunningham | B30B 9/305 |
| | | | 100/269.01 |
| 7,930,893 B2 | 4/2011 | Coffey | |
| 8,141,734 B2 | 3/2012 | Wang et al. | |
| 8,353,167 B2 | 1/2013 | McGann | |
| 8,418,607 B2 * | 4/2013 | Kachkovsky | B30B 1/103 |
| | | | 100/215 |
| 8,463,449 B2 * | 6/2013 | Sanders | G05B 15/02 |
| | | | 320/101 |
| 2002/0056377 A1 * | 5/2002 | Gawley | B30B 1/006 |
| | | | 100/35 |
| 2003/0205979 A1 | 11/2003 | Papari et al. | |
| 2004/0174268 A1 | 9/2004 | Scott et al. | |
| 2005/0080520 A1 * | 4/2005 | Kline | B03B 9/06 |
| | | | 701/1 |
| 2005/0281653 A1 * | 12/2005 | Channel | B60L 8/00 |
| | | | 414/498 |
| 2006/0255033 A1 | 11/2006 | Yang et al. | |
| 2007/0101875 A1 * | 5/2007 | Poss | B30B 9/3007 |
| | | | 100/229 A |
| 2009/0001151 A1 | 1/2009 | Wagner | |
| 2011/0137484 A1 | 6/2011 | Poss et al. | |
| 2013/0233853 A1 * | 9/2013 | Yang | B65F 1/02 |
| | | | 220/211 |

\* cited by examiner

WASTE MANAGEMENT DEPOSIT AND COMPACTION STATION WITH WIRELESS CAPABILITY

CROSS-REFERENCE TO RELATED APPLICATIONS

This application is a U.S. national stage application under 35 U.S.C. §371 of PCT International Application Serial No. PCT/US2015/017455, which has an international filing date of Feb. 25, 2015 and designates the United States of America, and which claims priority to U.S. Provisional Application Ser. No. 61/944,281, filed Feb. 25, 2014. The disclosures of these prior applications are hereby expressly incorporated by reference in their entirety.

BACKGROUND

The present disclosure relates to a system and apparatus for receiving and compacting waste while simultaneously providing a source for wireless data communication.

It is common practice for public venues to supply waste receptacles for the collection and management of waste. Throughout many cities, metropolitan areas, event venues, and the like, waste collection units are strategically located in areas commonly occupied by the public. The waste collection units are usually simple cylindrical or rectangular containers that range in volume and are configured to receive a disposable plastic liner.

To further facilitate the centralization of waste, and reduce the likelihood of unwanted objects getting into or out of the container, units also often have a removable top portion. The removable top portion can have a door that is maintained in a closed position by a spring, hydraulic or other similar mechanism. The door can be manipulated by the user, either by force, foot pedal, proximity sensor, button, or the like, to allow access to the interior of the container for the user to distribute trash. Waste collection units that incorporate a removable top and door are beneficial because they ensure that trash remains within the container and is not blown out by the wind or removed by an animal.

Other similar waste receptacles may incorporate a compaction mechanism as well. The compaction mechanism allows for the distributed waste to be compacted after it is deposited into the waste receptacle. The compaction process is beneficial because it allows the waste receptacle to contain more material in a smaller volume than receptacles that do not compact the waste. The compaction mechanism also requires an energy source to accomplish adequate compaction. Energy has been provided for the compaction process through connecting the receptacle to an electrical outlet or allowing the unit to operate through the use of batteries. Further, solar cells located on the top portion of the receptacle have been utilized to charge batteries that power the compaction process.

In addition to managing the waste that is created by large groups of people, a more recent need has developed for providing wireless data access to those same groups. Wireless data access has become an important asset to an efficient society. The popularity of smartphones and wireless communications has created a very strong desire for wireless accessibility. Wireless technology has been developed to accommodate large groups of people but is often limited in coverage to very specific areas. Wireless access is greatly inhibited by physical structures such as buildings and other solid forms found throughout an urban environment. While citywide wireless accessibility is desirable, it is currently limited to very narrow coverage areas.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 16b is a logic process for checking the electrical components of the control system of FIG. 16a;

FIG. 16c is a logic process for formatting and reporting data obtained by the control system of FIG. 16a;

FIG. 16d is a logic process for shutting down the control system of FIG. 16a;

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
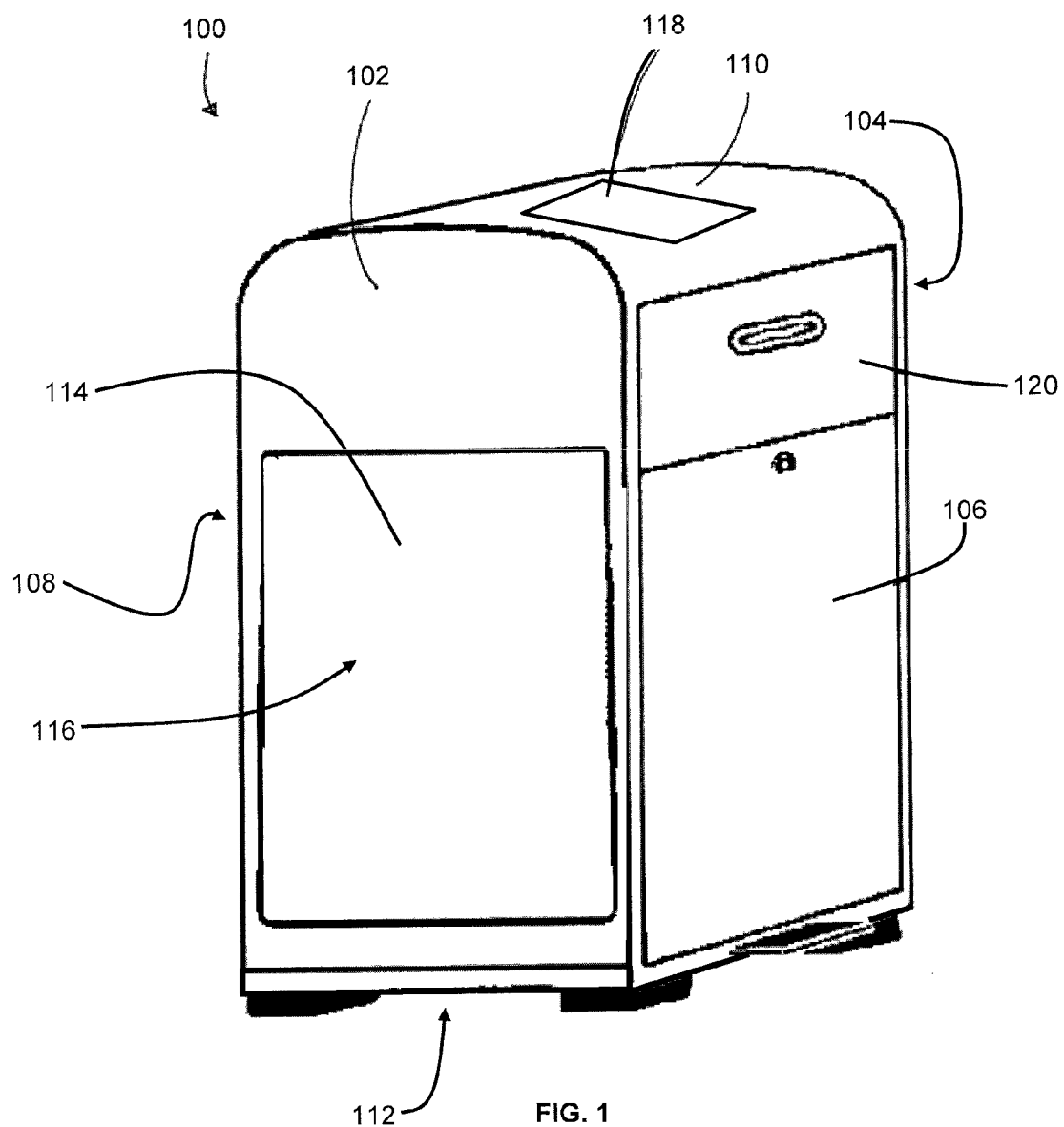
FIG. 1 is a perspective view of one embodiment of a trash receptacle.
Figure 3:
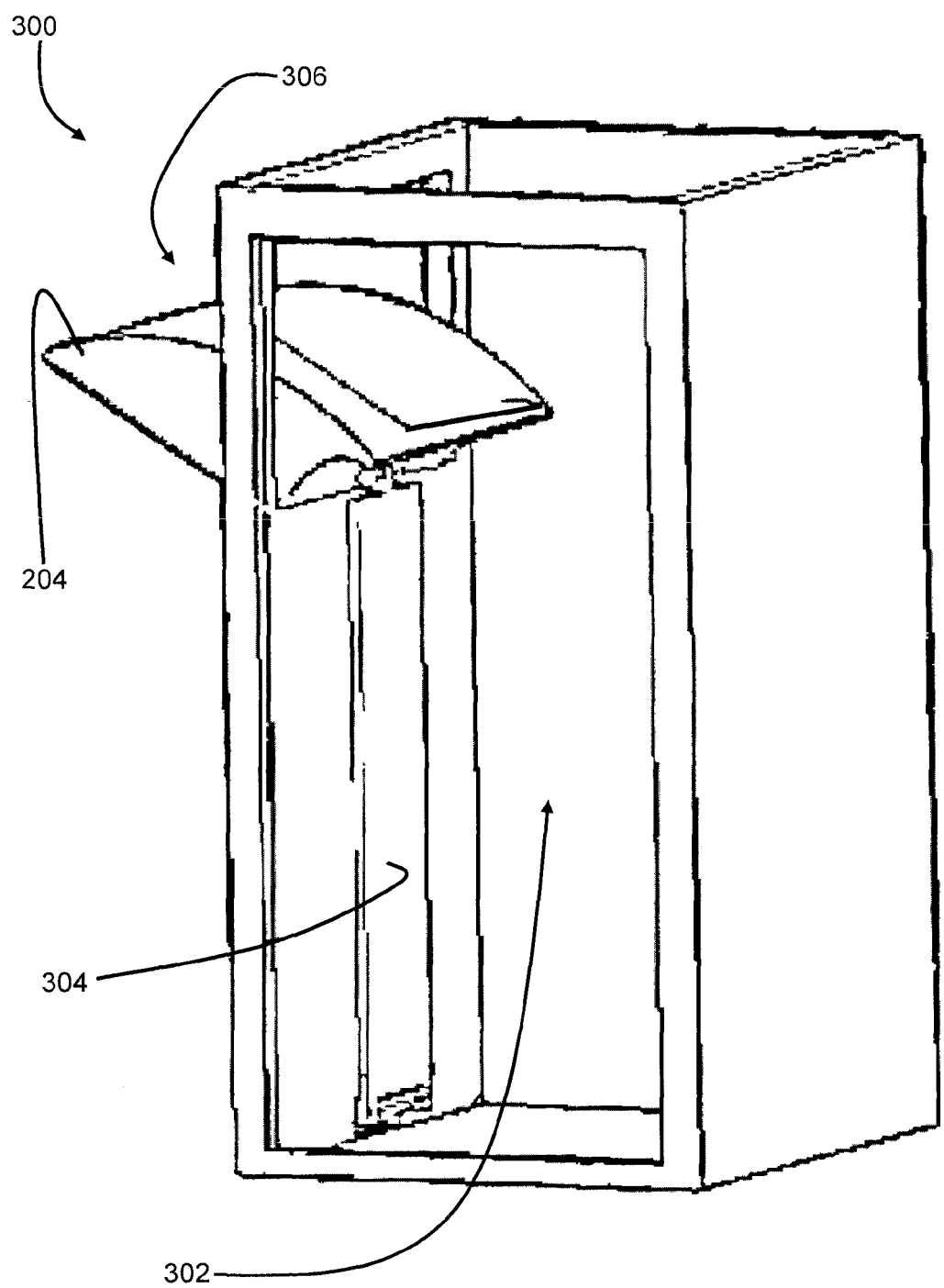
FIG. 3 is a partial perspective view of one embodiment of the present disclosure.

FIG. 1 illustrates a perspective view of a receptacle 100 of one embodiment of the present disclosure. In particular, FIG. 1 shows a substantially rectangular structure that is comprised of a first side 102, a second side 104, a front side 106, a rear side 108, a top side 110, and a bottom side 112. The first side 102, second side 104, front side 106, rear side 108, top side 110, and bottom side 112 can be substantially composed of steel, aluminum, plastic or any other similar material and substantially encompass an interior region 302 (FIG. 3).

Each of the first side 102 and the second side 104 can further contain a clear member 114 that can allow for weather sensitive electronics to be located within the interior region 302 and be viewed from the exterior of the receptacle 100. The material of the clear member 114 can be glass, acrylic, plastic, or any other similar material that is at least partially transparent. Further, the clear member 114 can be configured to protect a touch-sensitive screen while still allowing user interaction from the exterior of the receptacle 100. The clear member 114 can be integrated into each of the first side 102 and the second side 104 to provide an at least partially airtight window that can allow the user to see at least some of the contents of the container 100. The clear member 114 can range in size and shape to accommodate a plurality of displaying functions. In one particular embodiment, the clear member 114 can be shaped to maximize the viewing area of a display 116 that may be located behind the clear member 114.

The display 116 can be a plurality of sizes. Further, there may be more than one display 116 located on or inside of the receptacle 100. The size of the display 116 can depend on the dimensions of the first side 102 and the second panel 104. In one aspect of the current disclosure, the display 116 size can substantially cover the first side 102 and the second side 104. Further, in one embodiment the display 116 size may be compatible with a common computer monitor or television screen and consist of a digital high definition monitor, an LED Flat-Panel monitor, an OLED screen or the like. The display 116 can be located on each of the first side 102 and the second side 104 to allow for the contents of the display 116 to be viewed from the exterior of the receptacle. The clear member 114 may protect the display 116 from being harmed by exterior objects such as debris thrown at the displays, rain, hail, snow or other expected natural or artificially induced hazards.

The top side 110 may also have a solar panel 118 incorporated into, or placed on top of, the top side 110. Placing the solar panel 118 on the top side 110 may be ideal because it allows for a surface that will be most directly in line with the sun. The solar panel 118 may be placed in an opening on the top side 110 or coupled on top of the top side 110 using couplers.

The solar panel 118 may be placed in the interior region 302 of the receptacle 100 to reduce the likelihood of theft. The solar panel 118 may be wider and longer than a cutout in the top side 110. The cutout can allow sufficient sunlight to reach the solar panel 118 while keeping the solar panel 118 substantially confined to the interior region 302 of the receptacle 100. This configuration can reduce the likelihood of theft because of the difficulty in removing the solar panel 118. While the configuration of placing the solar panel 118 in a cutout has been described, this disclosure should not be limited to such a configuration. One skilled in the art can understand how other methods could be used to secure the solar panel 118 to the top side 110. Such methods can include, but should not be limited to, coupling the solar panel 118 to the top of the top side 110 with secure couplers, covering the solar panel 118 with a theft-resistant transparent material, coupling metallic bands across the solar panel 118 to hold it in place, and the like.

Figure 2:
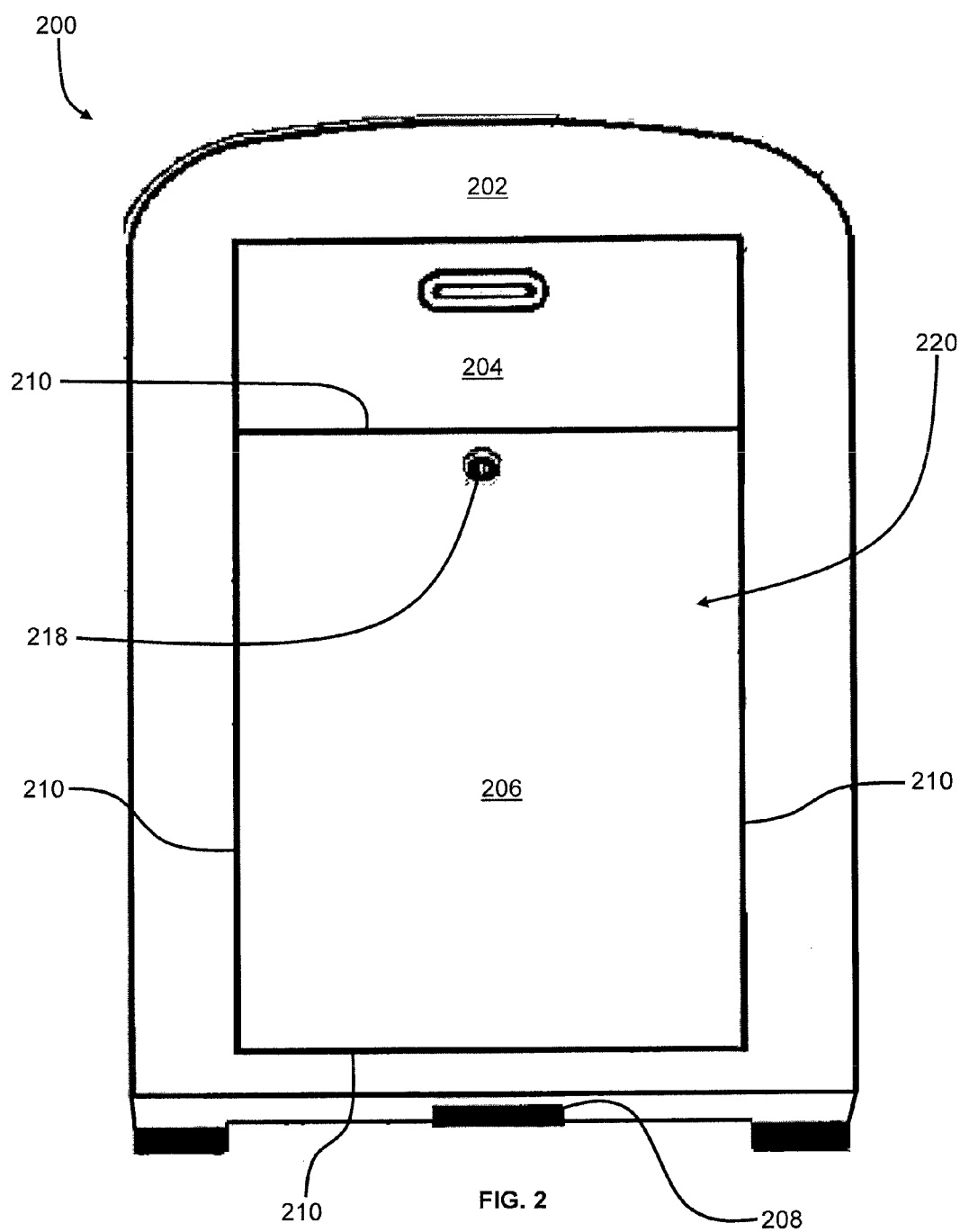
FIG. 2 is a front side view of the trash receptacle of FIG. 1.

A front view 200 of the receptacle 100 is shown in FIG. 2. An access door 206 can occupy a majority of the front side 106 of the receptacle 100 and be substantially surrounded by a frame member 202. The access door 206 can be pivotally coupled at an outside edge 210 and have a lock 218 at one or more of the outside edges 210. The access door 206 can be pivotally coupled at any one of the outside edges 210 and can allow the access door 206 to swing from a closed position 220, to an opened position (not shown). One skilled in the art can understand how any one of the outside edges 210 can be pivotally coupled to the frame member 202 to allow the access door 206 to swing about the pivot and all such variations of the pivotal coupler's location should be considered as incorporated herein.

The lock 218 can be located to engage the frame member 202 at the opposite side of the hinged outside edge 210. The lock 218 can removeably couple the access door 206 to the frame member 202 when the lock 218 is in an engaged position. Further the lock 218 can be manipulated to a disengaged position and allow the access door 206 to rotate from the closed position 220 to an opened position (not shown). The particular number of locks 218, and the manner in which they are engaged and disengaged should not limit the present disclosure. One skilled in the art can understand how using multiple locks 218 instead of one lock 218 may be desirable. Multiple locks 218 can add increased safety and security by ensuring that the access door 206 remains fully closed on all outside edges when the locks 218 are engaged. Further, the particular means for engaging and disengaging the lock 218 should not be limited. Such means as a key and keyhole, a proximity receiver and transmitter, or any other common locking mechanism can be used for the present disclosure.

The access door 206 can allow access into the interior region 302 of the receptacle 100 by approved personnel. This can be advantageous for both allowing a trash container within the interior region 302 to be emptied and for maintaining the electrical components within the receptacle 100. In another aspect of the current disclosure, the access door 206 may be removable entirely from the front side 106 to allow for uninhibited access to the interior region 302.

FIG. 2 also illustrates a slot door 204. The slot door 204 can control the access to the interior region 302 by restricting access to the interior region 302 unless a foot pedal 208 is engaged. The foot pedal 208 may be located on the front side 106 of the receptacle in an area that allows for the foot pedal 208 to be easily accessed. The foot pedal 208 may pivot between a first position and a second position. Further, as the foot pedal 208 is moved from the first position to the second position, the slot door 204 can also move from a first position 120 (FIG. 1) to a second position 306 (FIG. 3).

The receptacle 100 is shown with the second side panel 104 substantially removed 300 in FIG. 3. The foot pedal 208 can be connected to the slot door 204 by a connecting member 304. The connecting member 304 can enable the movement of the foot pedal 208 from the first position to the second position to move the slot door 204 from the first position 120 to the second position 306. The foot pedal 208 and the slot door 204 can be maintained in the first position 120 by a spring or other elastic or weighted member (not shown). The spring can substantially maintain the slot door 204 in the closed position. The spring or weight may have material properties that allow for the foot pedal 208 to be engaged by a human force sufficient to pivot the slot door 204 from the first position 120 to the second position 306. While a spring or weight have been specifically disclosed, one skilled in the art can appreciate that there are other possible methods that can be used to maintain a position until sufficient force is applied. Such methods can also include a hydraulic or pneumatic actuator, a mechanical locking mechanism, and the like.

The foot pedal 208 can also store energy for a compaction cycle. The foot pedal 208 can compress or rotate a spring, compress air into a chamber, lift a weighted member or the like for later release during the compaction cycle. The foot pedal 208 can be used to create more potential energy each time the foot pedal 208 is moved from the first position to the second position. After sufficient potential energy is stored by one of the methods mentioned above, a compaction process may be activated either mechanically or under the direction of an electronic controller (not shown). Alternatively, in one embodiment the foot pedal may add hydraulic pressure to a hydraulic system. The hydraulic pressure may immediately move a hydraulic cylinder or it may be stored for later use.

Figure 4:
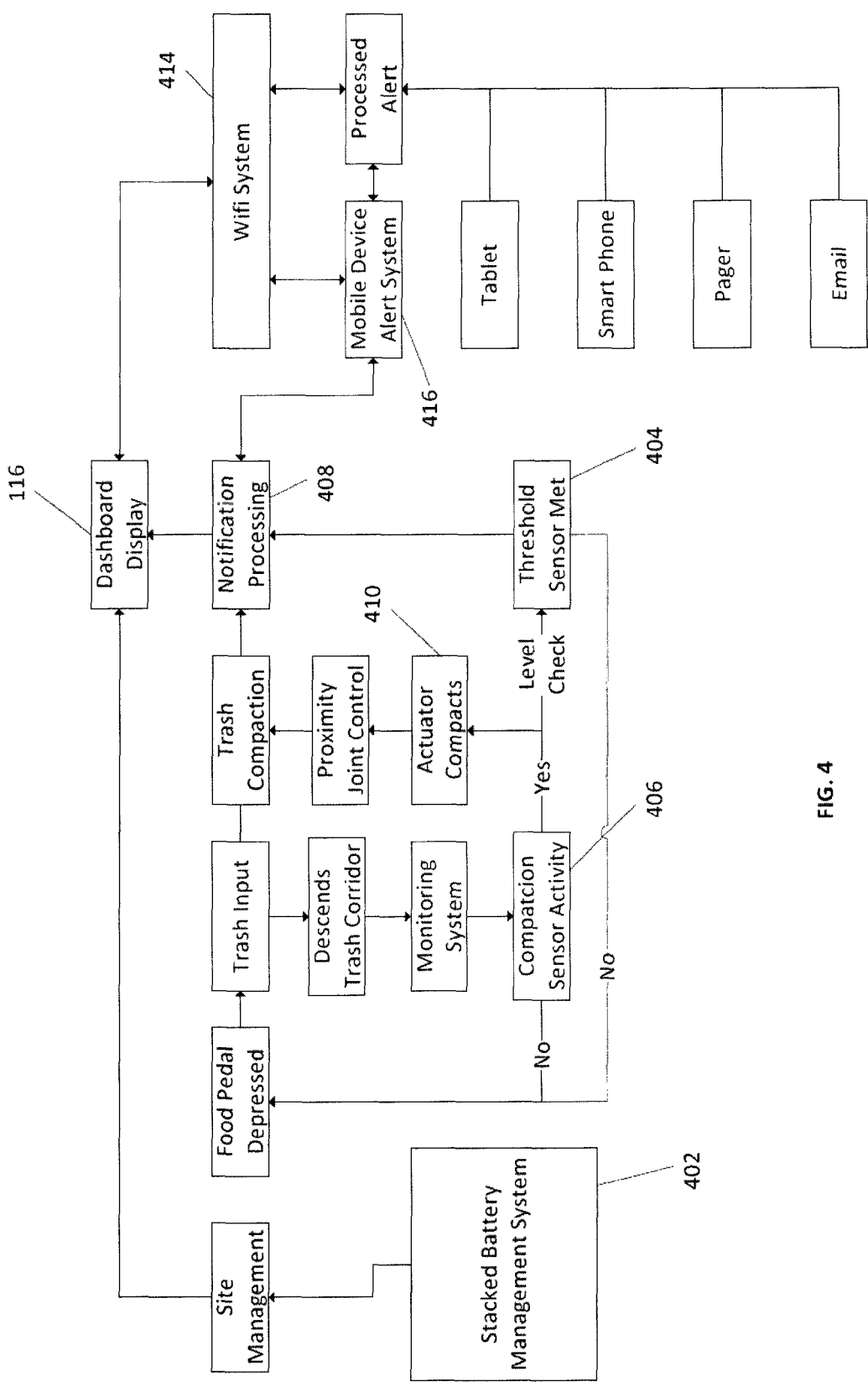
FIG. 4 is a flow diagram of a method of providing an integrated wireless data accessibility and management system within a trash receptacle.

Further, located within the interior region 302 can be the electrical components that power and control the trash receptacle 100. A flow diagram 400 of a method of providing an integrated wireless data accessibility and management system within a trash receptacle is illustrated in FIG. 4. The electrical components located within the interior region 302 of the receptacle 100 can include at least a stacked battery management system 402, a threshold sensor 404, a compaction sensor 406, a notification processor 408, a compaction actuator 410, the display 116, a Wi-Fi transmission system 414, and a mobile device alert system 416.

In the alternative to using the foot pedal 208 to create potential energy for the compaction process, the stacked battery management system 402 can energize the compaction process. The battery management system 402 can consist of any number of batteries designed to power the actuator 410 during a compaction cycle. In one embodiment, there can be three batteries located alongside one another. The compaction cycle may be accomplished utilizing the power supplied by a battery through the battery management system 402. In a multi battery system, when one battery loses charge, the battery can be removed and replaced by a fully charged battery without compromising the compaction cycle. This embodiment can also incorporate a monitoring system that utilizes the notification processor 408, display 116, and/or the mobile device alert system 416 to provide an alert that any one of the three batteries may need replaced.

While the stacked battery management system 402 can be used to power the compaction process, a separate battery or battery pack (not shown) may be used to power the compaction sensor 406, the threshold sensor 404, the notification processor 408, the display 116, the mobile device alert system 416, and the Wi-Fi transmission system 414. The second battery pack can be electronically independent from the stacked battery management system 402 and have a separate notification sent from the notification processor 408 to indicate the level of charge. Further, the solar panel 118 may be electrically coupled to the battery or battery pack to supply supplemental power to the battery or battery pack when the receptacle 100 is exposed to sunlight. The solar panel 118 may provide supplemental energy to the battery or battery pack to prolong the battery life of the battery or battery pack. Under ideal conditions, when there is adequate sunlight and total exposure of the solar panel 118, the solar panel 118 may substantially recharge the battery or battery pack. While the battery or battery pack may be charged by the solar panel 118, the multi battery system controlled by the battery management system 402 may be electrically independent from, and not charged by, the solar panel 118. In a different embodiment, the battery management system 402 may be charged by the solar panel 118 along with the battery or battery pack. Alternatively, the battery management system 402 may have a separate solar panel for supplemental charging.

The receptacle 100 may also have an auxiliary power option that can be electrically coupled with a standard electrical outlet (not shown). When the auxiliary power source is electrically coupled to an external source, the notification processor 408 may also act as a power management controller and allow the receptacle 100 to be powered through the external source. When auxiliary power is supplied, the battery management system 402 and the battery or battery pack can be bypassed. Further, if the auxiliary power is provided, the auxiliary power may also charge both the stacked battery management system 402 and the battery or battery pack. This embodiment allows the receptacle 100 to function either remotely off of the stacked battery management system 402 and the battery or battery pack or through electronic coupling with an external source.

The compaction process can be monitored by the compaction sensor 406 and threshold sensor 404. The compaction sensor 406 can consist of any number of sensors designed to determine how much material has been distributed into the interior region 302. There can be one or more compaction sensor 406 located in the interior region 302. The one or more compaction sensor 406 may be specifically located within the interior region 302 and communicate with the notification processor 408 to send notifications and control the compaction process. The notification processor 408 may then indicate the amount of material within the interior region 302. The number or type of compaction sensors 406 used can determine the resolution sent to the notification processor 408. For example, three sensors can be placed within the interior region 302 to identify when the interior region 302 is 50%, 75%, and 80% full or a more precise sensor can be utilized to detect precisely how full the receptacle 100 is. One skilled in the art can understand how a plurality of sensors can be used for this application such as capacity displacement sensors, photoelectric sensors, ultrasonic sensors, and strain gauges to name a few and this disclosure should not be limited to one specific type of sensor.

In addition to the compaction sensor 406, the receptacle 100 can have the threshold sensor 404 that determines when the interior region 302 has reached maximum capacity. In one embodiment, a single precise sensor can be used for both the compaction sensor 406 and the threshold sensor 404. When the threshold sensor 404 indicates that the contents of the interior region 302 have reached a maximum capacity, it may communicate with the notification processor 408 and the actuator 410 to perform the compaction process. The notification processor 408 may use the display 116, the mobile device alert system 416, and/or the Wi-Fi transmission system 414 to communicate the state of the interior region 302 to another device or communication means such as an email, text message, or notification on a management application or computer program. The threshold sensor 404 may be separate from the compaction sensor 406 or it may be the same. Further, the threshold sensor 404 can be comprised of a plurality of different types of sensors such as capacity displacement sensors, photoelectric sensors, ultrasonic sensors, and strain gauges to name a few.

The compaction process can be controlled by monitoring both the compaction sensor 406 and the threshold sensor 404. The compaction sensor 406 can activate the compaction process when waste inside the receptacle 100 reaches a predefined level. Further, the threshold sensor 404 can activate the compaction process when the interior region 302 is determined to be substantially full. In the alternative, the compaction process can be controlled by a timer. For example, the compaction process may occur once every day or week depending on the need for that particular unit. One skilled in the art can understand the many ways the described compaction sensor 406 and threshold sensor 404 may be used along with the notification processor 408 to control the compaction process.

In addition to the threshold sensor 404 communicating with the notification processor 408, the threshold sensor 404 can communicate with the slot door 204 locking mechanism (not shown). The slot door locking mechanism can be engaged when the threshold sensor 404 indicates the interior region 302 is full. The engaged slot door 204 locking mechanism can prevent the slot door 204 from moving to the second position 306. The threshold sensor 404 can communicate with the slot door locking mechanism to ensure the interior region 302 cannot be filled passed the desired limit or threshold.

The slot door 204 locking mechanism may also be utilized to restrict access to the interior region 302 when the compaction process is occurring. When the compaction process starts, the slot door 204 locking mechanism can be engaged to prevent users from opening the slot door 204 during the compaction process. Engaging the slot door 204 locking mechanism during the compaction cycle can prevent users from distributing waste in areas that may mechanically disrupt the operation of the compaction process.

The notification processor 408 can control the communication to and from the receptacle 100. The notification processor 408 can be connected to a wireless service provider, such as AT&T, T-Mobile, Verizon Wireless, or the like, to allow the notification processor 408 to wirelessly communicate data without requiring a hardwired communication line such as an Ethernet cable. The notification processor 408 can send notifications via the wireless service provider through the mobile device alert system 416. The mobile device alert system 416 can send notifications regarding the amount of material within the interior region 302, the battery power left in the stacked battery management system 402, the display's 116 status, the second battery or battery pack power level, or any other desired notification.

The display 116 can be controlled remotely by transmitting data to and from the receptacle 100 through the wireless service provider. The display 116 can show the status of the various electrical components within the receptacle 100. Further, the display 116 can be used to show messages, warnings, advertisements, public safety concerns and the like to the surrounding area. The display 116 can be located in any area of the receptacle 100 that would create the most visibility to the surrounding public and any number of displays 116 may be mounted or coupled to the receptacle 100.

The display 116 can be controlled and monitored remotely and independently from the other electrical components within the receptacle 100 through the Wi-Fi transmission system 414. The display 116 can be managed separately from the mobile device alert system 416 to allow a first party to monitor the status of the electrical components within the receptacle 100 while a second party monitors and manages the contents of the display 116.

In addition to providing visual information to the surrounding public through the display 116, the receptacle 100 may also provide access to data by forming a Wi-Fi transmission system 414 that is accessible to or useable by the public. The Wi-Fi transmission system 414 may further provide wireless access to data through the wireless service provider. The Wi-Fi transmission system 414 can allow users to access data while the users are within the wireless capabilities of the receptacle 100. Multiple receptacles 100 can be located within a given area to create a channel blanket across the given area. Technology such as Extricom's SignalShare can be utilized to enable high throughput to users by eliminating co-channel interference to provide better coverage. The overlapping channel blankets can allow a user to continue to use the Wi-Fi transmission system 414 to access data as the user moves from the range of a first receptacle to the range of a second receptacle. Further, the channel blanket system of multiple receptacles ensures seamless mobility and continuity of Wi-Fi access with no access point handoffs as the user moves throughout the area covered by the channel blanket. The Wi-Fi transmission system 414 can provide Wi-Fi communication to and from the user to the receptacle 100 while the wireless service provider can provide data access to the users who are connected via Wi-Fi.

The receptacle 100 may also have an external network receptacle (not shown). The network receptacle can allow the unit to be wired directly to an external data source such as a cable modem or network to bypass the use of the wireless service provider. When the network receptacle is connected to a functioning network or modem, the receptacle 100 can utilize the wired connection, rather than the wireless service provider, to provide data communications. Further, when the network receptacle is connected to a functioning network or modem, the receptacle 100 can utilize the network receptacle to provide a majority of the data communication required by the electrical components within the receptacle 100.

A computer program or application for a smartphone or other mobile device (not shown) can control the notification processor 408 and/or the display 116. The program or application can have a grid or a map that mimics the location of the receptacles 100. The grid or map can indicate where each receptacle 100 is located and can further allow access to the monitored electrical information of the receptacle 100. The computer program or application may further show information such as the stacked battery 402 status, the second battery or battery pack status, and the volumetric level of waste in the interior region 302. Further, the program or application can create a warning signal, such as a blinking light or highlighted area, when one of the receptacles 100 requires maintenance.

The computer program or application can further be used to manage the display 116. The computer program or application can be used to organize what is shown on the display 116, how long any image is shown, how the various images transition from one another, and any other aspects of the display 116 that may be beneficial to monitor remotely. If more than one display 116 is located on a receptacle, the computer program can either show the same image on each display 116 or it may control each display 116 independently. Further, the program may provide for secure access to certain capabilities to limit administrative control. For example a trash company or municipality may view the screen that shows which receptacles require maintenance but be denied access to change the content being shown on the display 116.

Figure 5:
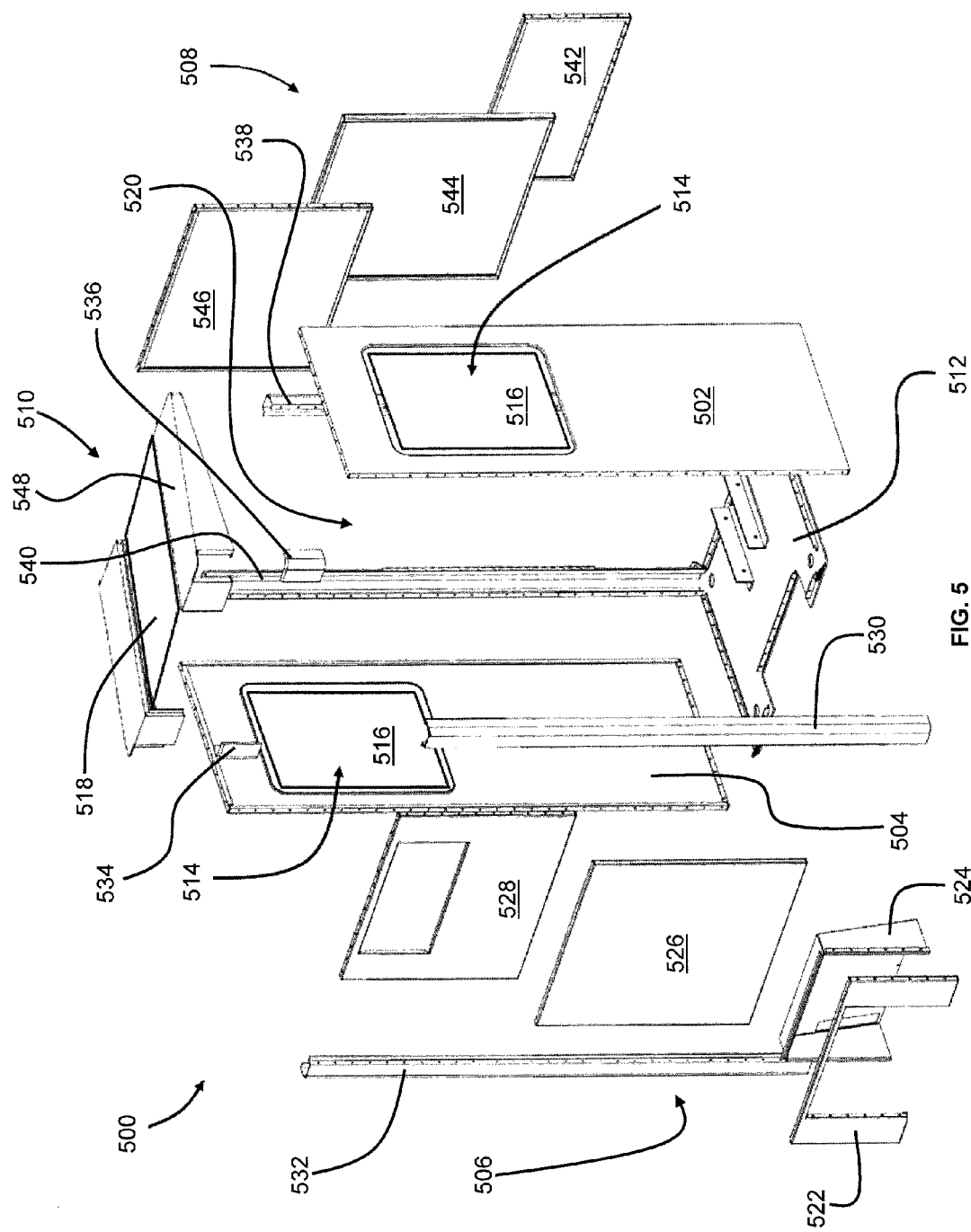
FIG. 5 is an elevated perspective view of expanded outer components of a second embodiment of a trash receptacle.

Referring now to FIG. 5, an exploded view of the components forming the outer shell of one embodiment of the receptacle 500 is shown. In this embodiment, the outer structure of a receptacle is comprised of a first side 502, a second side 504, a front side assembly 506, a rear side assembly 508, a top side assembly 510, and a bottom side 512. The first side 502, second side 504, front side assembly 506, rear side assembly 508, top side assembly 510, and bottom side 512 can be substantially composed of steel, aluminum, plastic or any other similar material and substantially encompass an interior region 520.

The front side assembly 506 may be composed of a pedal face 522, a pedal backing 524, a front door 526, and a slot panel 528. The pedal face 522 and pedal backing 524 may be coupled to one another to create a recess along a planar front face created along the surface of the pedal face 522. A first and second corner support 530, 532 may also define a coupling point between the front side assembly 506 and the first and second side 502, 504. More particularly, the first corner support 530 may be disposed about the length of the receptacle 500 to create a substantially 90 degree transition between the front side assembly 506 and the second side 504. Similarly the second corner support 532 can be disposed about the length of the receptacle 500 to create a substantially 90 degree transition between the front side assembly 506 and the first side 502.

The components of the front side assembly 506 may be coupled to the first corner support 530, the second corner support 532, or both the first and second corner support 530, 532. The pedal face 522 may be coupled to the first corner support 530 on one end and the second corner support 532 on the other end. The pedal face 522 may also be coupled to the bottom side 512. Additionally, the pedal backing 524 may be coupled the pedal face 522 and the bottom side 512. The front door 526 may be pivotally coupled to the first corner 530, the second corner support 532, the pedal face 522, or the slot panel 528. Further, the front door 526 may not be pivotally coupled to any panel at all. In one embodiment the front door 526 may pivot to a fully opened position to allow a user to gain access to the interior region 520. Further, the front door 526 may have a locking mechanism to only allow authorized personnel to open the front door 526. Further, one skilled in the art would know that the door described above could be located on any panel and this disclosure should not be limited to the door being on the front side assembly 506.

The slot panel 528 may also be coupled to the first corner support 530 and the second corner support 532. The slot panel 528 may further be coupled to the top side assembly 510 along a top edge. The first and second corner supports 530, 532 may terminate at a first and second marker 534, 536. The first and second markers 534, 536 may also couple the first and second corner supports 530, 532 to the top side assembly 510 and/or the slot panel 528. The markers 534, 536 may define a coupler that can house an illuminating or reflective member (not shown).

The first side 502 may be coupled to the first corner support 530 at a substantially 90 degree angle from the front side assembly 506. The first side 502 may further be coupled to the bottom side 512 at a bottom end and the top side assembly 510 at a top end. The first side 502 may also be coupled to a third corner support 538 at a back end. Similarly, the second side 504 may be coupled to the second corner support 532 at a substantially 90 degree angle from the front side assembly 506. The second side 504 may be coupled to the bottom side 512 at a bottom end and the top side assembly 510 at a top end. The second side 504 may also be coupled to a fourth corner support 540 at a back end.

Both the first side 502 and the second side 504 may define an opening 514. The opening 514 may be sufficiently sized to accommodate a visual communication device. A clear member 516 may substantially seal the opening 514 to the structure defining the opening 514. The clear member 516 may allow the visual communication device to project images through the opening 514 while protecting one surface of the visual communication device from damage.

The rear side assembly 508 may be comprised of a first, second, and third panel 542, 544, 546. The first panel 542 may be at a lower portion of the rear side assembly 508. The first panel 542 may be coupled to the bottom side 512 at a bottom end, the third corner support 538 at a first side, the fourth corner support 540 at a second side, and the second panel 544 at a top side. Alternatively, the first panel 542 may not be coupled to the second panel 544 at all.

The second panel 544 can be pivotally coupled to the receptacle 500. In one embodiment, the second panel 544 is pivotally coupled along a bottom edge to the first panel 542. In a different embodiment, the second panel 544 is coupled to the third corner support 538 along a first edge or the fourth corner support 540 along a second edge. In yet another embodiment, the second panel 544 is pivotally coupled to the third panel 546. Finally, the second panel 544 may not be pivotally coupled to any elements of the receptacle 500. Alternatively, it may be slideably or fixedly coupled to the receptacle 500.

The third panel 546 may be coupled to the third corner support 538 on a first end and the fourth corner support 540 on a second end. The third panel 546 may also be coupled to a portion of the top side assembly 510 along a top edge. In one embodiment, the bottom edge of the third panel 546 is pivotally coupled to the second side 504. In another embodiment, the third panel 546 is not coupled to the second panel 544.

The top side assembly 510 may be comprised of at least one frame member 548 and a solar panel 518. The frame member 548 may couple the top side assembly 510 to the slot panel 528, the first, second, third, and fourth corner supports 530, 532, 538, 540, the second side 504, the third panel 546, the first side 502, and the first and second marker 534, 536. The frame members 548 may further couple the solar panel 518 to the receptacle 500. The solar panel 518 may be coupled to the frame members 548 in such a way that allows the frame members 548 to substantially restrict the solar panel 518 from being removed from the top side assembly 510.

A person having skill in the relevant art will understand the plurality of ways various components can be coupled to one another to create the outer portion of the receptacle 500 and this disclosure should not be limited to any particular embodiment. In one embodiment of the receptacle 500, the components may be coupled to one another to create a substantially water resistant outer shell. This can be achieved by using seals at the panel joints as would be understood by a person having skill in the relevant art. Further, an adhesive that has sealing properties, such as silicone or caulk, could be used to couple the components of the receptacle 500 to one another in a water resistant manner. A person having skill in the relevant art would understand the plurality of methods that could be used and this disclosure should not be limited to any single method.

Figure 6:
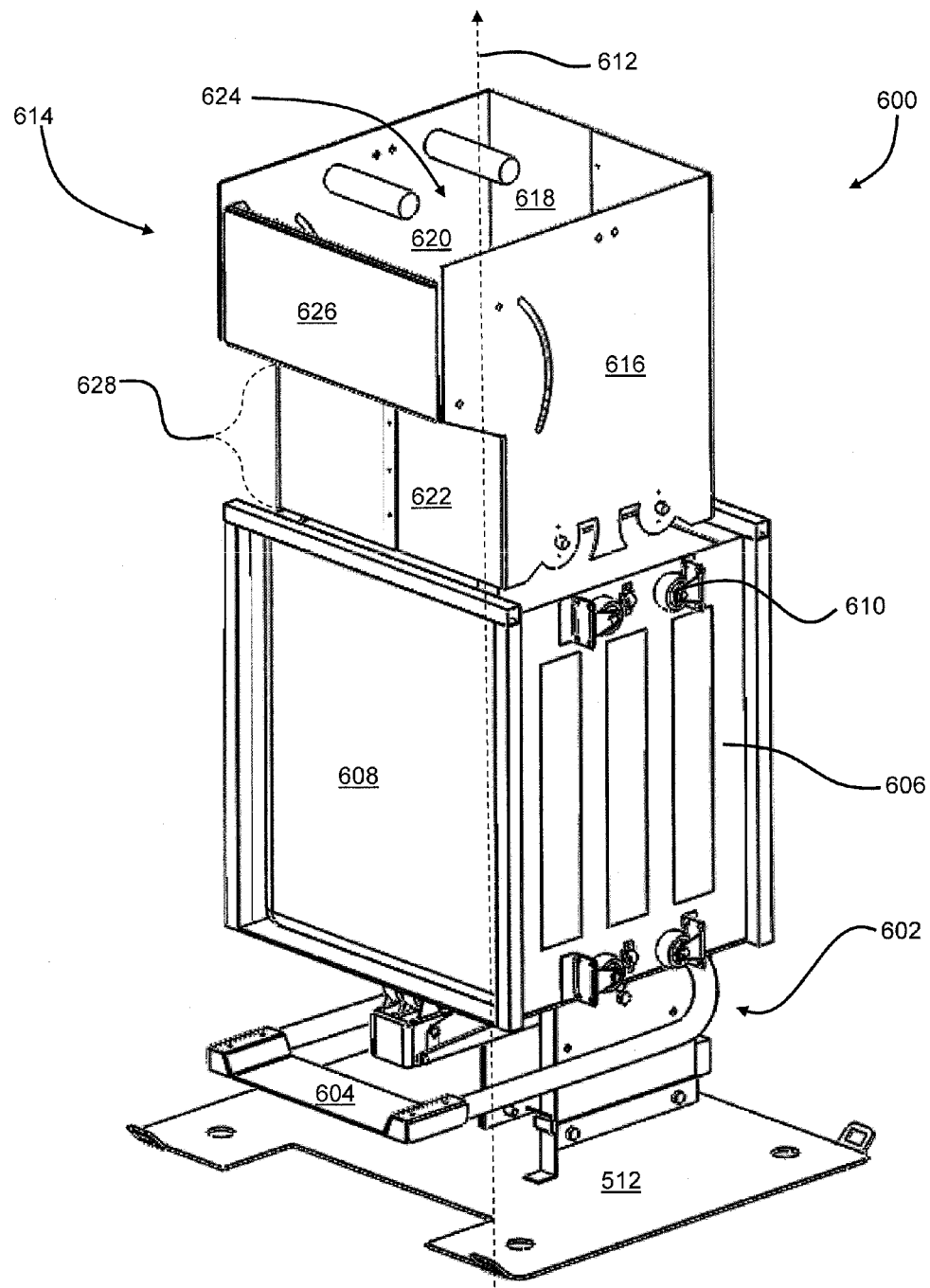
FIG. 6 is an elevated perspective view of inner components of the trash receptacle of FIG. 5.

Referring now to FIG. 6, some of the internal components 600 are shown. A hydraulic lift assembly 602 may be coupled to the bottom side 512. The hydraulic lift assembly 602 may be comprised of a foot pedal 604 operatively coupled to a hydraulic cylinder 1204 (FIG. 12) and rollers 704 (shown in FIG. 7a). Adjacent to the hydraulic cylinder 1204 and rollers 704 may be a basket carrier 606 and a basket 608. The basket carrier 606 may define a region capable of receiving the basket 608 therein. Further, the basket carrier 606 may have at least one roller 610 coupled to an exterior wall of the basket carrier 606. The roller 610 may correspond to a rail support 902 (FIG. 9) that can guide the basket carrier 606 in a linear direction 612.

The top portion of the internal components may have a receiving assembly 614. The receiving assembly 614 may be composed of a plurality of walls 616, 618, 620, 622, coupled to one another to define an internal cavity 624. The receiving assembly 614 may also have a door 626 coupled thereto. The receiving assembly 614 may be sized to correspond to the basket 608. More specifically, the receiving assembly 614 may become at least partially disposed within the basket 608. In one embodiment, a substantial portion 628 of the receiving assembly 614 may become disposed within the basket 608.

Figure 7A:
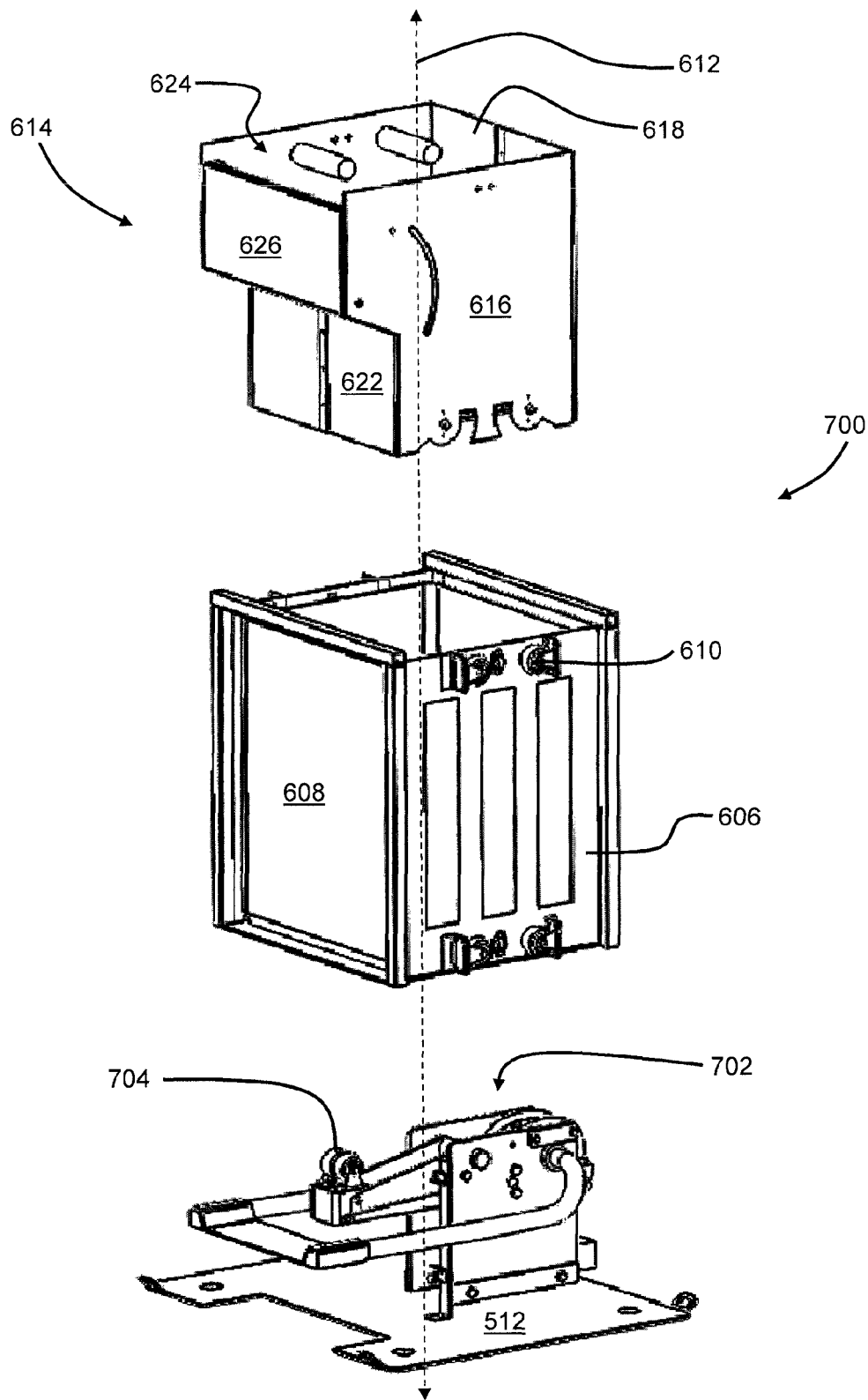
FIG. 7a is a linearly expanded view of the trash receptacle of FIG. 6.

An expanded view 700 is shown in FIG. 7a where the internal components 600 are expanded relative to one another in the linear direction 612. The expanded view 700 more clearly shows the hydraulic cylinder 1204 and the roller 704 disposed beneath the basket carrier 606. The basket carrier 606 may have a rail (not shown) that corresponds to the roller 704. The rail may act as a guide for the roller 704 as the hydraulic cylinder 1204 is engaged.

Figure 7B:
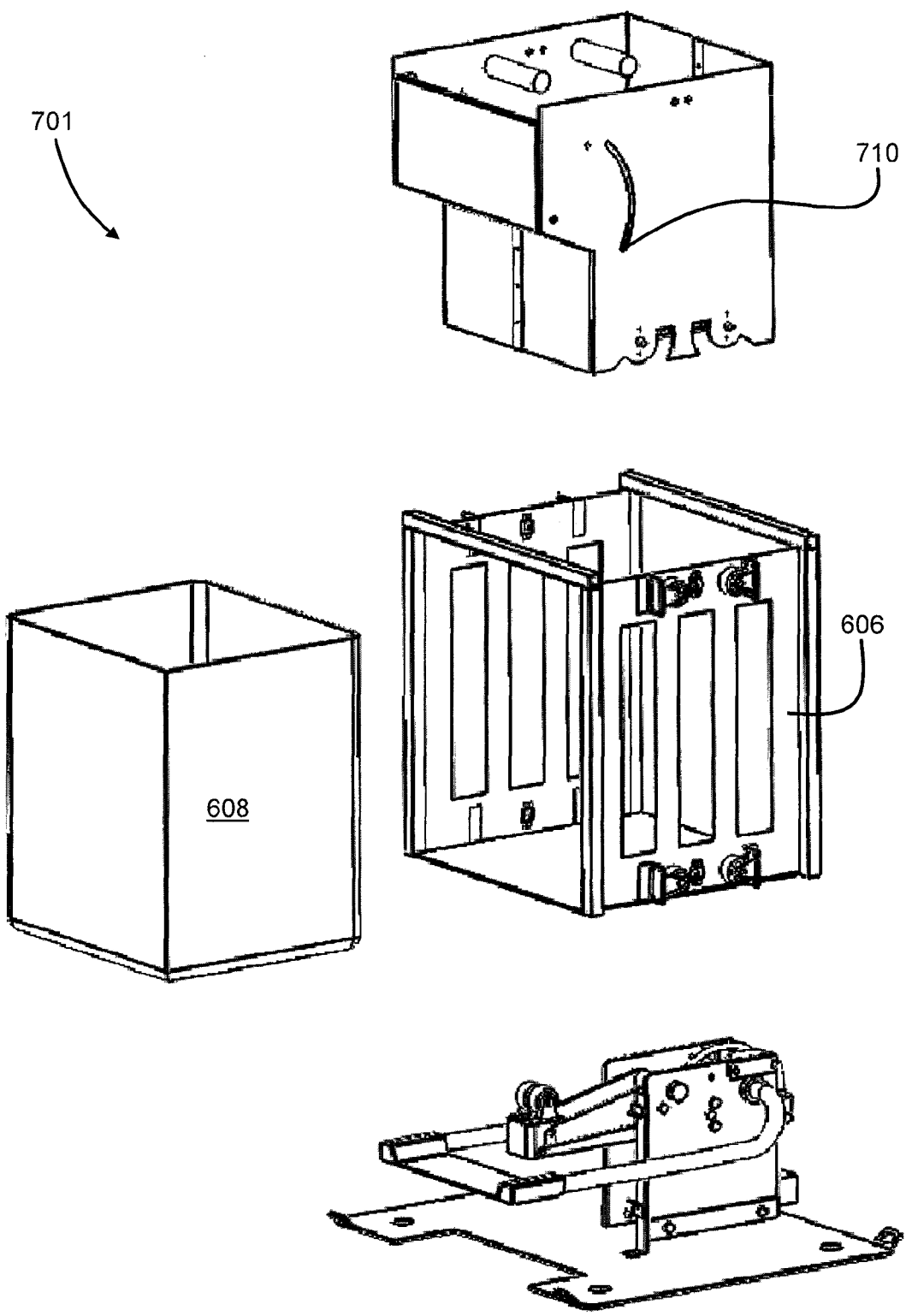
FIG. 7b is an expanded view of the trash receptacle of FIG. 7a with a basket offset from a basket carrier.
Figure 7C:
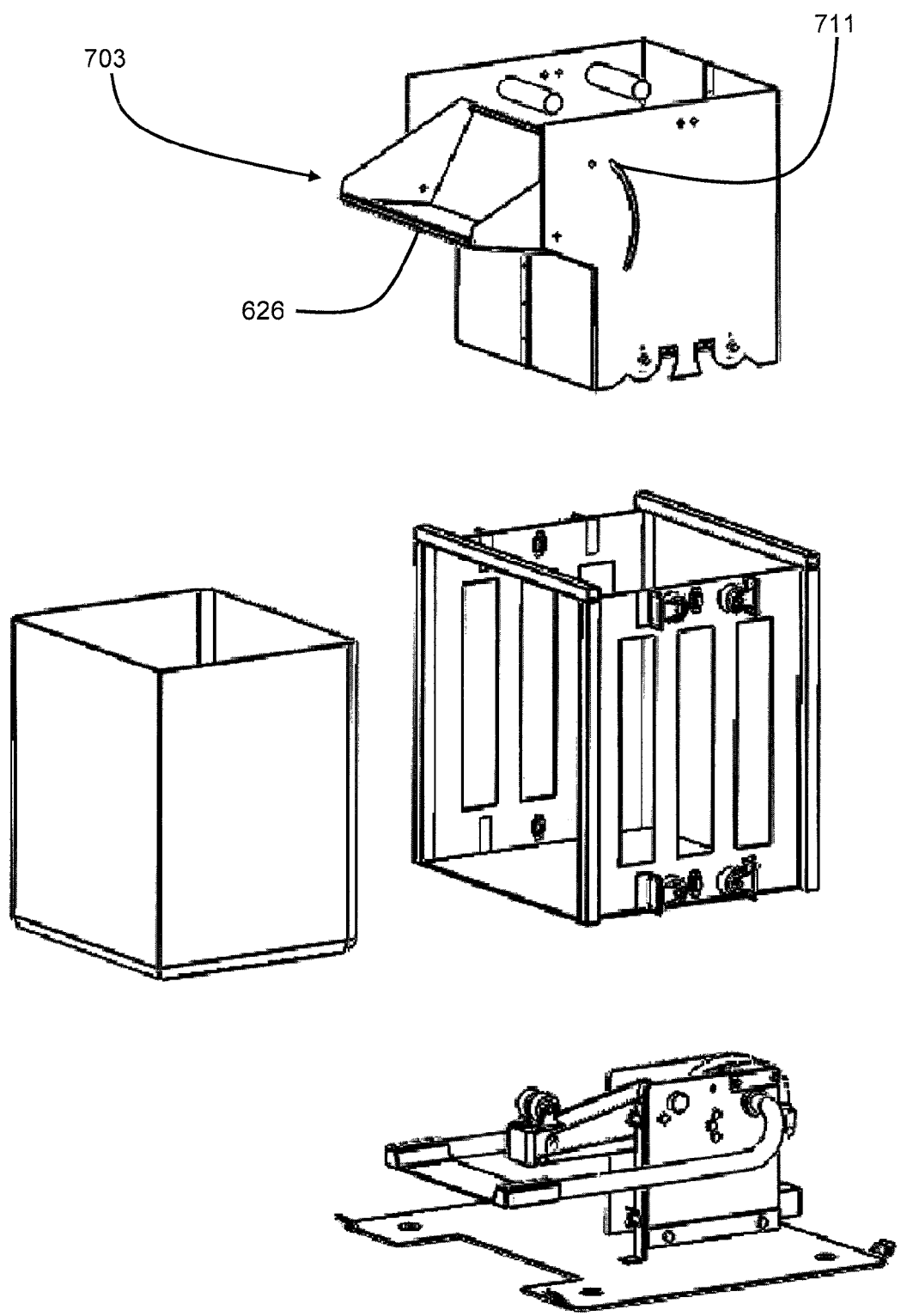
FIG. 7c is an elevated perspective view of the trash receptacle of FIG. 7b, with a door oriented in an opened position.
Figure 8:
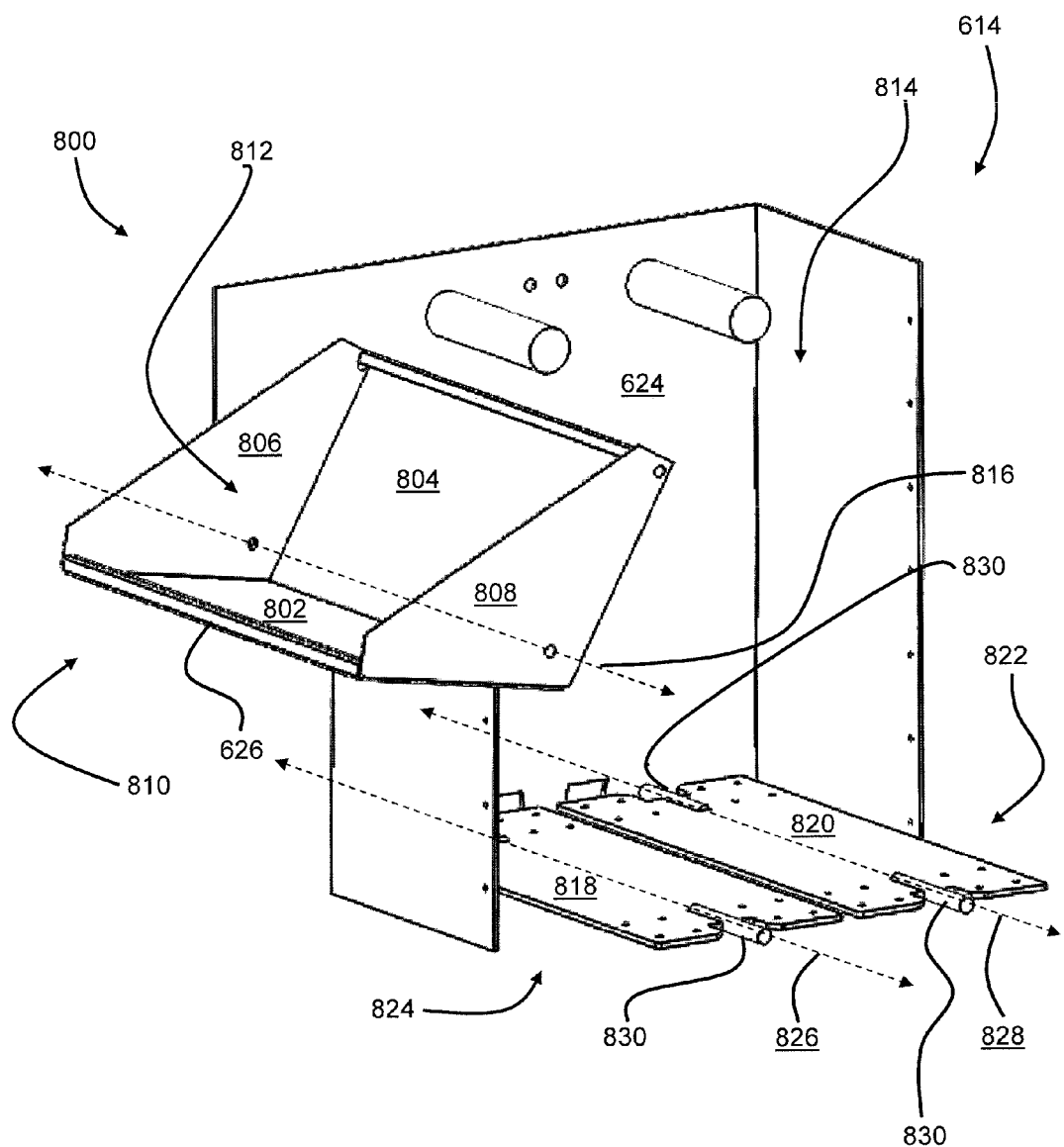
FIG. 8 is a partial perspective view of a receiving assembly from the trash receptacle of FIG. 6.

The basket 608 may be removed from the basket carrier 606 as shown in the exploded view 701 of FIG. 7b. Further, the door 626 is shown in an opened position 703 in FIG. 7c. The receiving assembly 614 will be better understood with reference to the partial cross sectional view 800 with the wall 616 removed as shown in FIG. 8. In FIG. 8, the door 626 is shown in the opened position 703.

The door 626 may be comprised of a first member 802 and a second member 804 coupled to a first side 806 and a second side 808. The first member 802 and the second member 804 may also be coupled to one another along a shared edge. The first and second members 802, 804 and the first and second sides 806, 808 may be coupled to one another to create a door assembly 810.

The door assembly 810 may have a substantially V-shaped cross section that defines an inner cavity 812 therein. In one embodiment, the inner cavity 812 may be specifically sized to meter the amount of debris that can enter a receiving cavity 814 at any one time. This may be achieved by pivotally coupling the door assembly 810 to the walls 620, 616 through a pivot axis 816. The pivot axis 816 may be disposed about a lower portion of the inner cavity 812 to allow the opening of the inner cavity 812 to be partially oriented away from the receiving cavity 814 in the opened position 800.

The receiving assembly 614 may also be comprised of a first and second paddle 818, 820. The first and second paddle 818, 820 may be oriented in a closed position 822 or an opened position (not shown). In the closed position 822, the paddles 818, 820 may become oriented to be in substantially planar alignment with one another. The paddles 818, 820 may also be sufficiently sized to correspond with the dimensions of a bottom opening 824 of the receiving assembly 614. In one non-limiting example, when the paddles 818, 820 are in the closed position 822, the receiving cavity 814 may be substantially blocked about the bottom opening 824 by the paddles 818, 820. In the closed position 822, and debris deposited through the door assembly 810 into the receiving cavity 814 will remain in the receiving cavity 814 until the paddles 818, 820 become oriented in the opened position.

The paddles 818, 820 may be coupled to the walls 616, 620 about a first and second paddle axis 826, 828. The first paddle axis 826 may be defined along a longitudinal and substantially centremost portion of the first paddle 818. The second paddle axis 828 may similarly be defined along a longitudinal and substantially centremost portion of the second paddle 820. The first and second paddles 818, 820 may also have at least one pivot member 830 disposed about the first or second paddle axis 826, 828. The pivot members 830 may pivotally couple the paddles 818, 820 to the walls 616, 620 to allow the paddles 818, 820 to transition between the opened position and the closed position 822.

At least one motor 1556 (FIG. 15) may be coupled to the paddles 818, 820 to provide an electronic means for transitioning the paddles 818, 820 between the opened position and the closed position 822. In one embodiment, the motor 1556 may contain chains or belts connecting a drive shaft of the motor 1556 to at least one pivot member 830 of each paddle 818, 820. In a different embodiment, a motor 1556 may be directly coupled to the pivot member 830. In yet another embodiment, the motor 1556 may drive the paddles 818, 820 through a plurality of gears.

Figure 9:
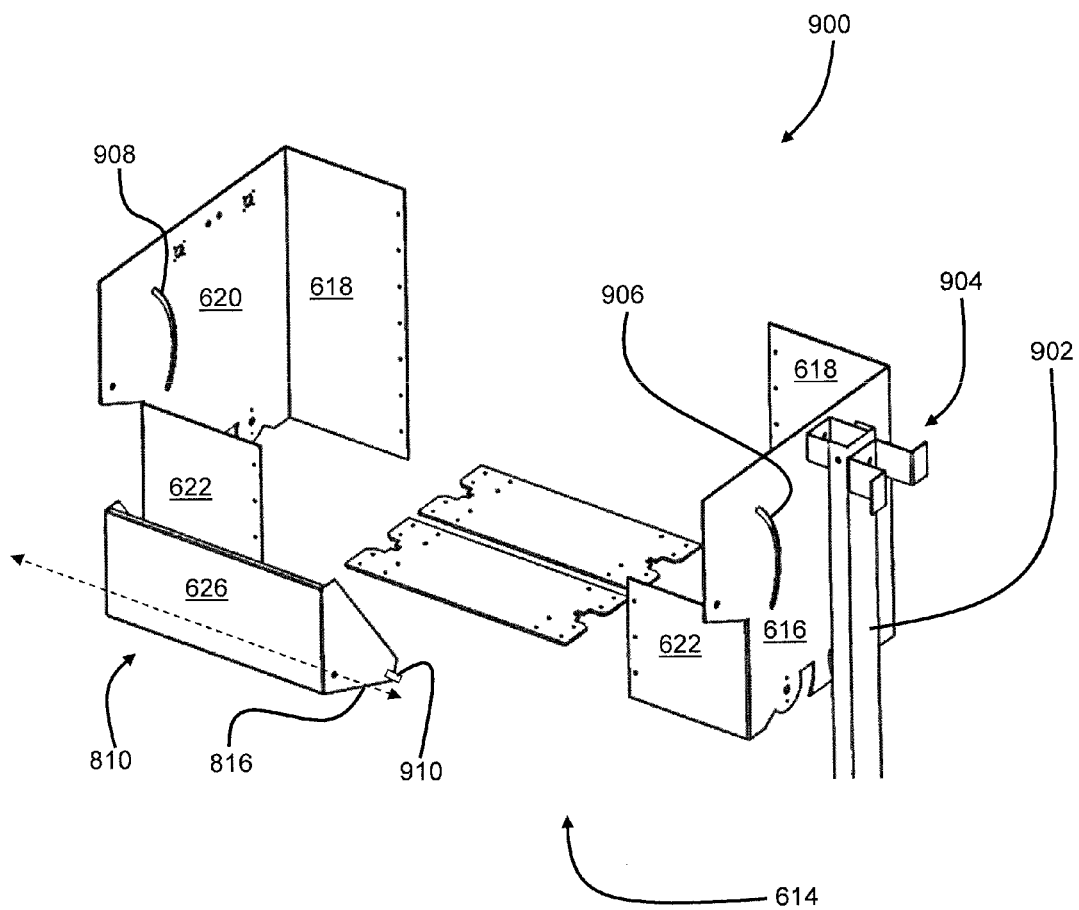
FIG. 9 is an expanded view of the receiving assembly of FIG. 8 with an additional wall shown.

Referring now to the exploded view 900 of the receiving assembly 614 shown in FIG. 9, the components are shown separated from one another. A partial section of the rail support 902 is shown coupled to the wall 616. The rail support 902 may extend substantially the height of the receptacle 500 and provide both structural support to the receiving assembly 614 and guidance to the basket carrier 606 (FIG. 6). In one embodiment, the rollers 610 of the basket carrier 606 may become disposed about the rail support 902. In this embodiment, the basket carrier 606 may be slideably coupled to the rail support 902 through the rollers 610. The rail support 902 may also provide a spacer assembly 904 between the receiver assembly 614 and the receptacle 500. In one embodiment, a second rail support (not shown) may be disposed about the wall 620 in a similar way as described above for the rail support 902.

A first and second guide slot 906, 908 are also shown in FIG. 9. The first guide slot 906 may be a substantially arc-shaped slot defined by the wall 616. Similarly, the second guide slot 908 may be a substantially arc-shaped slot defined by the wall 620. The first and second guide slots 906, 908 may be substantially similar in size and shape and slideably couple with at least one door guide 910.

The door guides 910 may be a pin-like extension from the first and second sides 806, 808 and extend away from the inner cavity 812. The door guides 910 may become disposed within the guide slots 906, 908 to define maximum and minimum rotation of the door assembly 810 about the pivot axis 816 and relative to the wall 622. When the door assembly 810 is in the fully closed position (FIG. 7b), the face of the door 626 and the face of the wall 622 may be substantially parallel to one another and the door guides 910 may be at one end 706 of the guide slots 906, 908. When the door assembly 810 is in the fully opened position (FIG. 7c), the face of the door 626 may be angularly offset from the face of the wall 622 and the guides 910 may be at a different end 711 of the guide slots 906, 908.

A person having skill in the relevant art understands that there are many ways to implement the pivotally opening function of door assembly 810 and this disclosure should not be limited to the particular method described herein. One skilled in the relevant art understands that a stop may be implemented on a portion of the door assembly 810 to restrict pivotal movement of the door instead of using slots and pins. Further, at least one hydraulic arm, spring, piston, or the like can be utilized to stop the door from opening past a certain point. Further still, the door may be coupled to a foot pedal that transitions the door between the closed position and the opened position, the maximum allowed movement of the foot pedal may define the maximum movement of the door. Accordingly, at least these methods for pivotally controlling a door movement are considered as incorporated herein and no single method is limiting.

Figure 10:
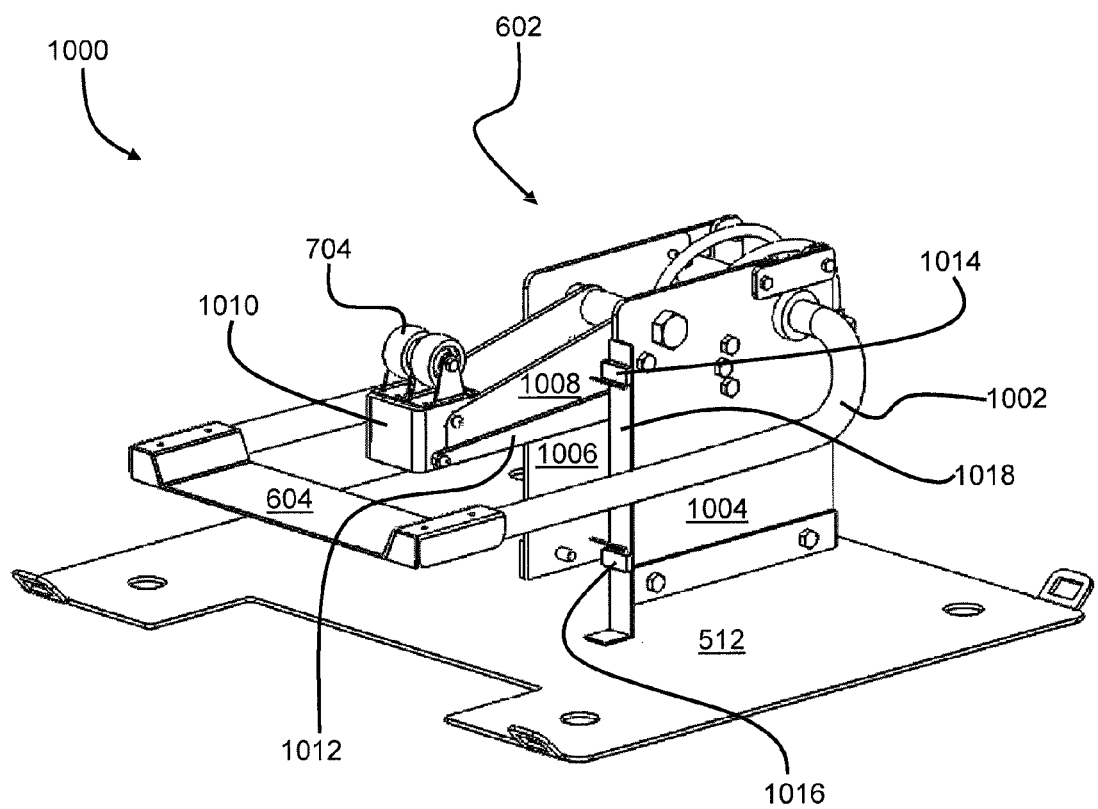
FIG. 10 is a front-side elevated perspective view of one embodiment of a hydraulic lift assembly.

An elevated perspective view 1000 of the bottom side 512 is shown in FIG. 10. The bottom side 512 may be removeably coupled to the hydraulic lift assembly 602. The hydraulic lift assembly 602 may be comprised of the foot pedal 604, at least one lever arm 1002, a first and second support plate 1004, 1006, the hydraulic cylinder 1204, an extension arm 1008, and the roller 704. The foot pedal 604 may be a substantially flat material sized to be engageable by a user's foot. The foot pedal 604 may be coupled to the lever arm 1002 to transfer a force input from the foot pedal 604 to the hydraulic cylinder 1204. If the hydraulic cylinder 1204 receives a force input, it may generate a force output that changes the angular orientation of the extension arm 1008 relative to the bottom side 512.

A platform 1010 may couple the roller 704 to the extension arm 1008. The platform 1010 may be pivotally coupled to both the extension arm 1008 and a position arm 1012 at different locations. As the angular orientation of the extension arm 1008 changes relative to the bottom side 512, the location of the platform 1010 also changes. The platform 1010 may define a bottom face that is substantially parallel to a face of the bottom side 512. As the extension arm 1008 changes the location of the platform 1010, the bottom face of the platform 1010 may remain parallel to the bottom side 512 because it is pivotally coupled with the position arm 1012. A person having skill in the relevant art will understand how to pivotally couple two members to one another in a way that allows the two members to remain parallel to one another as they rotate.

A first and second sensor 1014, 1016 are also shown in FIG. 10. The first and second sensor 1014, 1016 may further be coupled to a support 1018. The first sensor 1014 may be coupled to the support 1018 at a location that indicates the hydraulic cylinder 1204 is in a first position. The second sensor 1016 may be coupled to the support 1018 at a location that indicates the hydraulic cylinder 1204 is in a second position. In one embodiment, the first position could be the most compressed position of the hydraulic cylinder while the second position may be the most extended position of the hydraulic cylinder. In yet another embodiment, the first position may be when the basket carrier 606 is in the lowest most position and the second position may be when the basket carrier 606 is in the upper most position.

Figure 11:
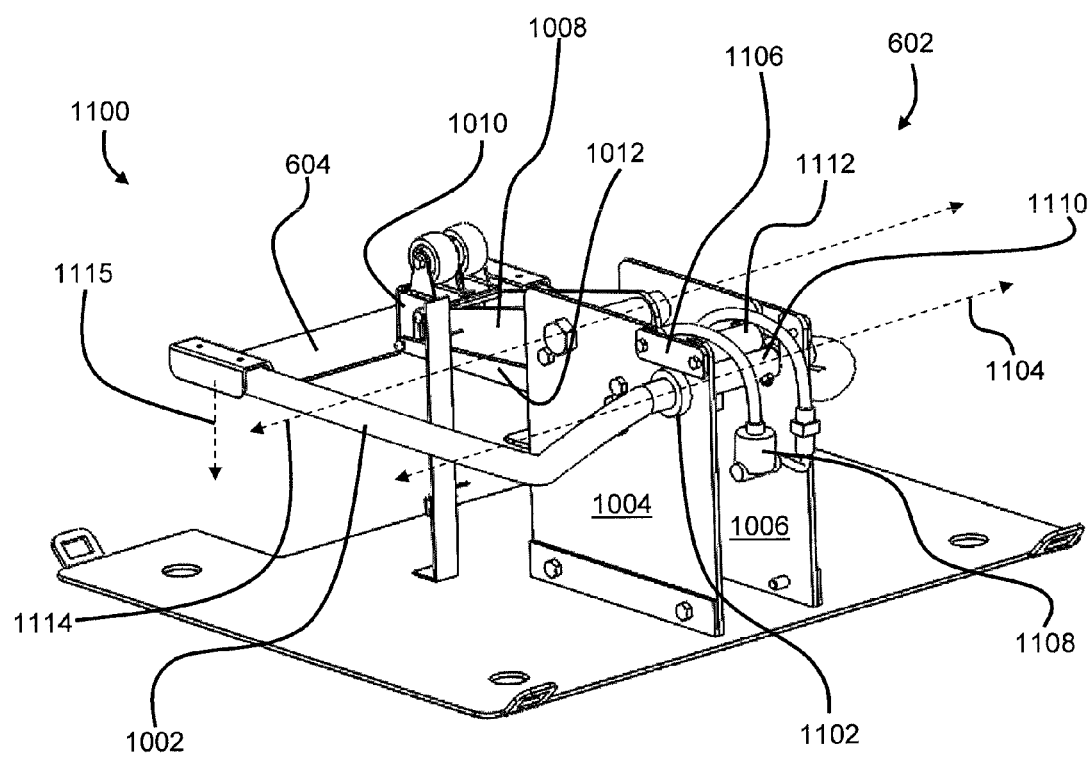
FIG. 11 is a back-side elevated perspective view of the hydraulic lift assembly of FIG. 10.

A backside perspective view 1100 of the hydraulic lift assembly 602 is shown in FIG. 11. In the perspective view 1100, at least one bearing or bushing 1102 may be disposed within the first and second support plate 1004, 1006. The bearing or bushing 1102 may be oriented to be disposed about the lever arm 1002 as it transitions through the first and second support plate 1004, 1006. The bearing or bushing 1102 may allow the lever arm 1002 to pivot about a lever axis 1104. The bearing or bushing 1102 may also be coupled to the first and second support plate 1004, 1006 by at least one retaining member 1106. The retaining member 1106 may allow the lever arm 1002 and the bushing or bearing 1102 to be slideably placed into the first and second support plate 1004, 1006. In one embodiment, this may allow the lever arm 1002 to become correctly positioned within the first and second support plate 1004, 1006.

A control valve 1108 may be fluidly coupled to the hydraulic cylinder 1204. The control valve 1108 may be electronically controlled to direct a hydraulic fluid (not shown) through the components of the hydraulic cylinder 1204. The control valve 1108 may have a first position, where the hydraulic cylinder 1204 will not allow the platform 1010 to lower. The control valve 1108 may also have a second position, where the platform 1010 may be lowered. In one embodiment, the control valve 1108 may also have a pressure transducer disposed therein. The pressure transducer can be used to determine the amount of pressure in the hydraulic system. In a different embodiment, the pressure transducer may be separate from the control valve 1108.

Figure 12:
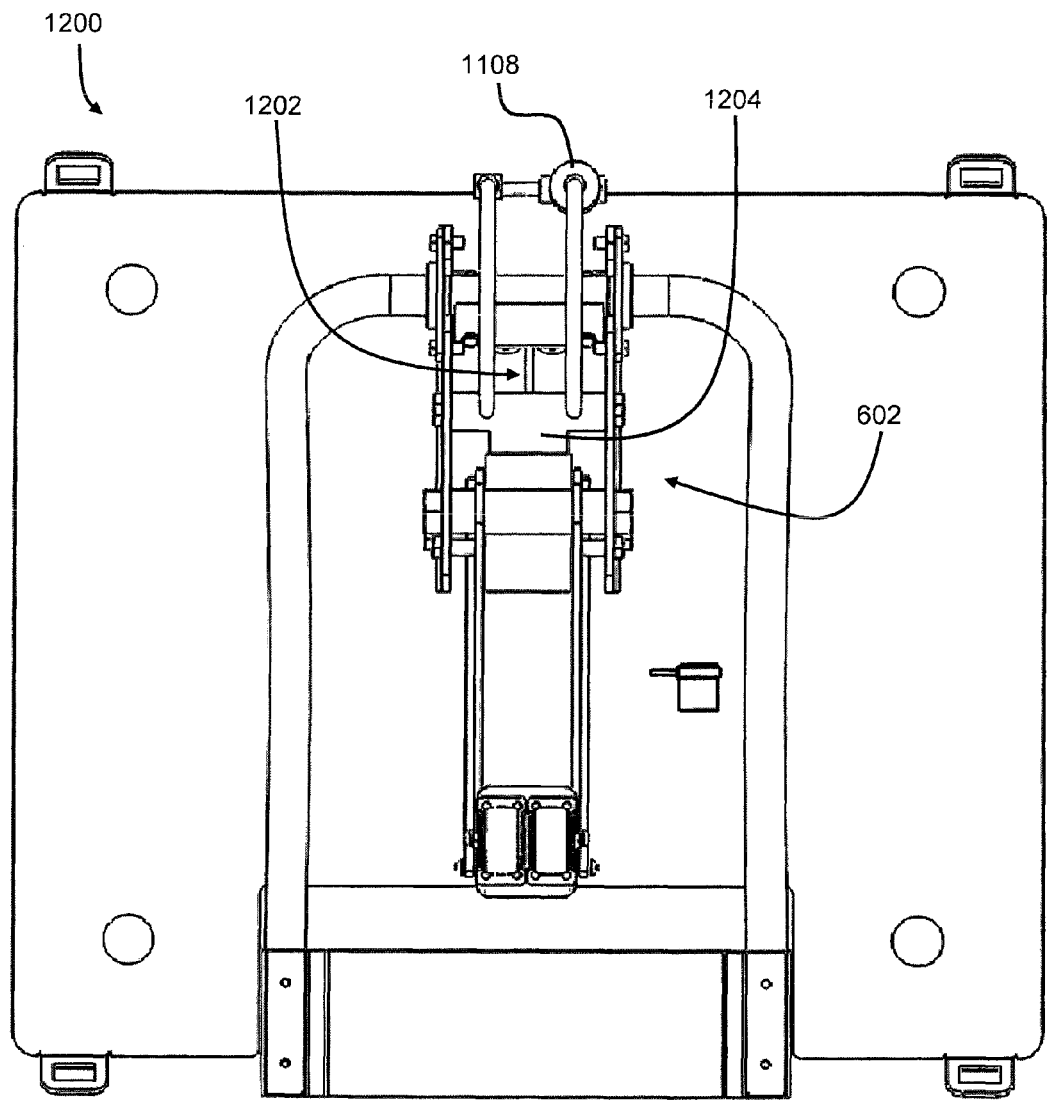
FIG. 12 is a top-side view of the hydraulic lift assembly of FIG. 10.

The lever arm 1002 may be coupled to a sleeve 1110. The sleeve 1110 may be disposed about the lever axis 1104 and also be coupled to a pump contact 1112. The pump contact 1112 may be offset from the lever axis 1104 and disposable to provide force to a pump assembly 1202 (FIG. 2) of the hydraulic cylinder 1204. If a force is applied to the lever arm 1002 in a down direction 1115, the lever arm 1002 may pivot about the lever axis 1104 to create a torque in the sleeve 1110. The torque in the sleeve 1110 may then be transferred to the pump contact 1112. Depending on the position of the control valve 1108, the pump contact 1112 may convert the torque applied to the pump contact 1112 to an engaging force on the pump assembly 1202 (FIG. 12).

Figure 13:
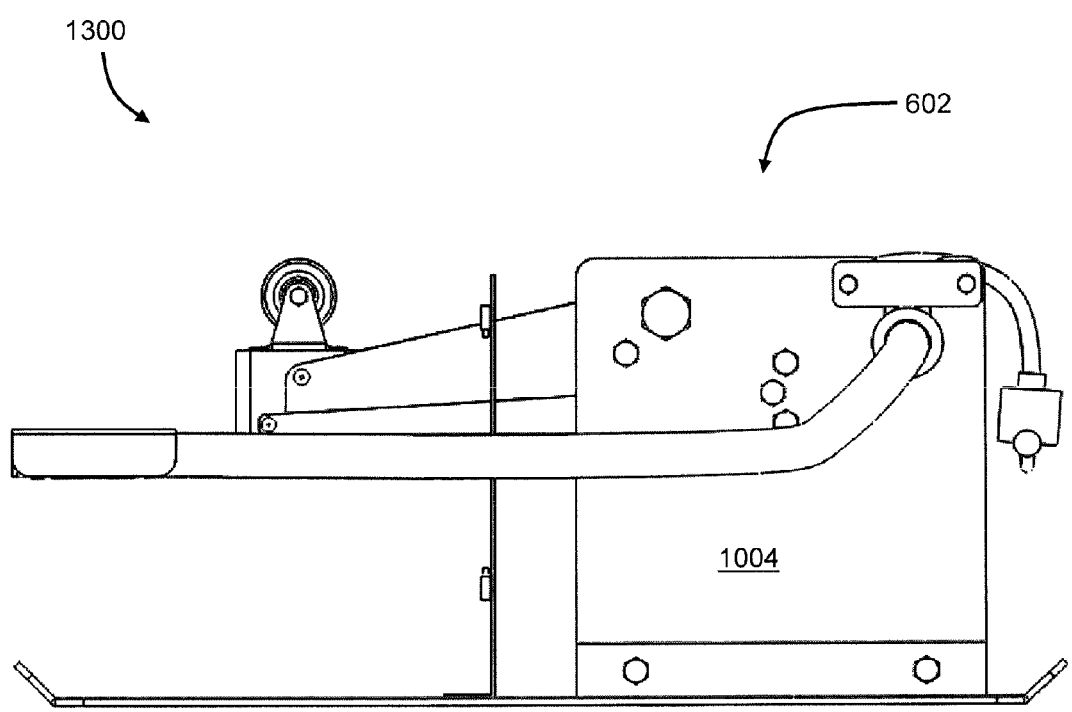
FIG. 13 is a side view of the hydraulic lift assembly of FIG. 10.

The extension arm 1008 may be pivotally coupled to the first and second support plate 1004, 1006 through a support axis 1114. The hydraulic cylinder 1204 may provide a force to the extension arm 1008 that causes the extension arm 1008 to rotate about the support axis 1114. As the extension arm 1008 rotates about the support axis 1114, the platform 1010 and roller 704 may be raised or lowered. A top side view 1200 of the hydraulic lift assembly 602 is shown in FIG. 12. The pump assembly 1202 may be fluidly coupled to the hydraulic cylinder 1204 to provide hydraulic pressure to the hydraulic lift assembly 602. The pump assembly 1202 may be reversible by the control valve 1108 to provide both an extending force and a retracting force to the hydraulic cylinder 1204 as is known in the art. Additionally, a side view 1300 of the hydraulic lift assembly 602 is shown in FIG. 13.

Figure 14:
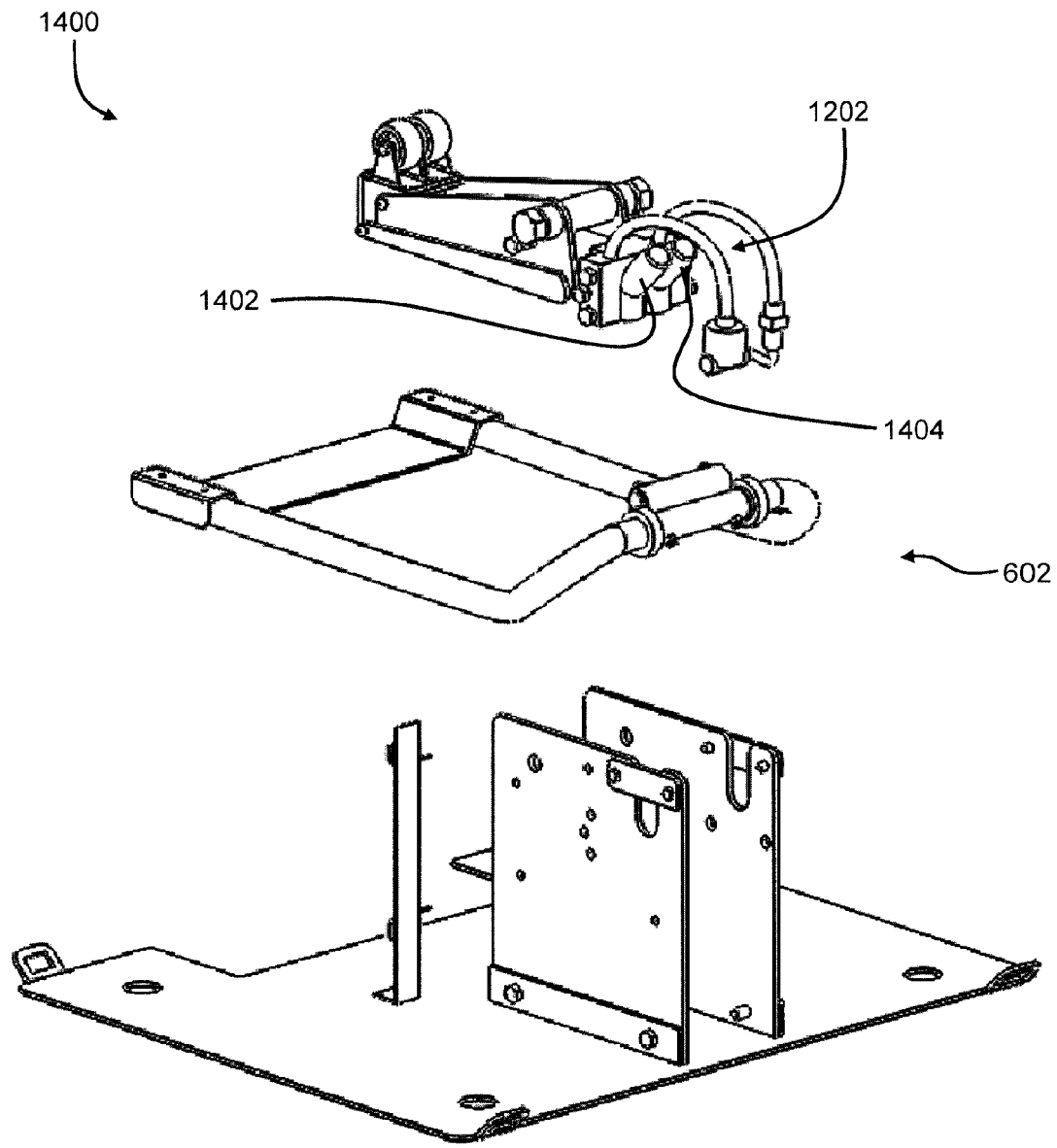
FIG. 14 is an expanded view of the hydraulic lift assembly of FIG. 10

Referring now to FIG. 14, an expanded perspective view 1400 of the hydraulic lift assembly 602 is shown. The pump assembly 1202 may have a first pump 1402 and a second pump 1404. The first and second pump 1402 and 1404 may provide the necessary fluid displacement to operate the hydraulic lift assembly 602 when a user applies a force to the foot pedal 604.

The components of the receptacle 500 may be coupled to one another to form a substantially compact, multipurpose system. In one embodiment, a user may desire to distribute refuse into the basket 608. In order to do this, the user may first step on the foot pedal 604 to pivot the door assembly 810 to the opened position 703. In one embodiment, this may be achieved by coupling a linkage (not shown) from the foot pedal 604 to the door assembly 810. As the foot pedal 604 is engaged by the user, the linkage may convert the force in the down direction 1115 into a force that moves the door assembly 810 into the opened position 703. Once the door assembly 810 is in the opened position 703, the user may deposit the refuse into the inner cavity 812 of the door assembly 810. The user may then release the foot pedal 604 and allow the door assembly 810 to transition to the fully closed position 220. Once in the fully closed position 220, the refuse placed therein may fall into the receiving cavity 814.

In addition to transitioning the door assembly 810 to the opened position 703, when the user engages the foot pedal 604 the pump contact 1112 may be forced into the pump assembly 1202. In turn, the hydraulic cylinder 1204 may expand, causing the platform 1010 to rise along with the rollers 704. The rollers 704 may slide along a bottom rail (not shown) coupled to the basket carrier 606. The basket carrier 606 may slide in the linear direction 612 towards the receiving assembly 614. The basket carrier 606 may slideably move in the linear direction 612 because of the roller's 610 interaction with the rail support 902.

The paddles 818, 820 may be in the closed position 822 as the substantial portion 628 of the receiving member 614 becomes disposed within the basket 608. The paddles 818, 820 may begin to contact any debris located within the basket 608 as it is forced towards the paddles 818, 820. Each step on the foot pedal 604 by a user may raise the basket 608 a little closer to the receiving assembly 614, compressing the debris located therein. Once the substantial portion of the receiving assembly 614 becomes disposed with the basket 608, the first sensor 1014 may indicate to a controller to release the control valve 1108 and allow the basket 608 to return to a lowered position.

While a compaction process has been described by raising the basket 608 into the substantial portion 628 of the receiving member 614, a person having skill in the relevant art would understand that a similar compaction process could be used that lowers the paddles down into the receiving member. Alternatively, a compaction process could compact debris against a side wall instead of a top or bottom surface. Accordingly, this disclosure should not be limited to any one compaction process.

Simultaneously with the release of the control valve 1108, the motors 1556 coupled to the paddles 818, 820 may rotate the paddles 818, 820 to the opened position. While the paddles 818, 820 are in the opened position, debris that has collected in the receiving cavity 814 may fall into the basket 608. The motors 1556 may then transition the paddles 818, 820 back to the closed position 822 and the cycle can start over with the carrier in the bottom position.

Figure 15:
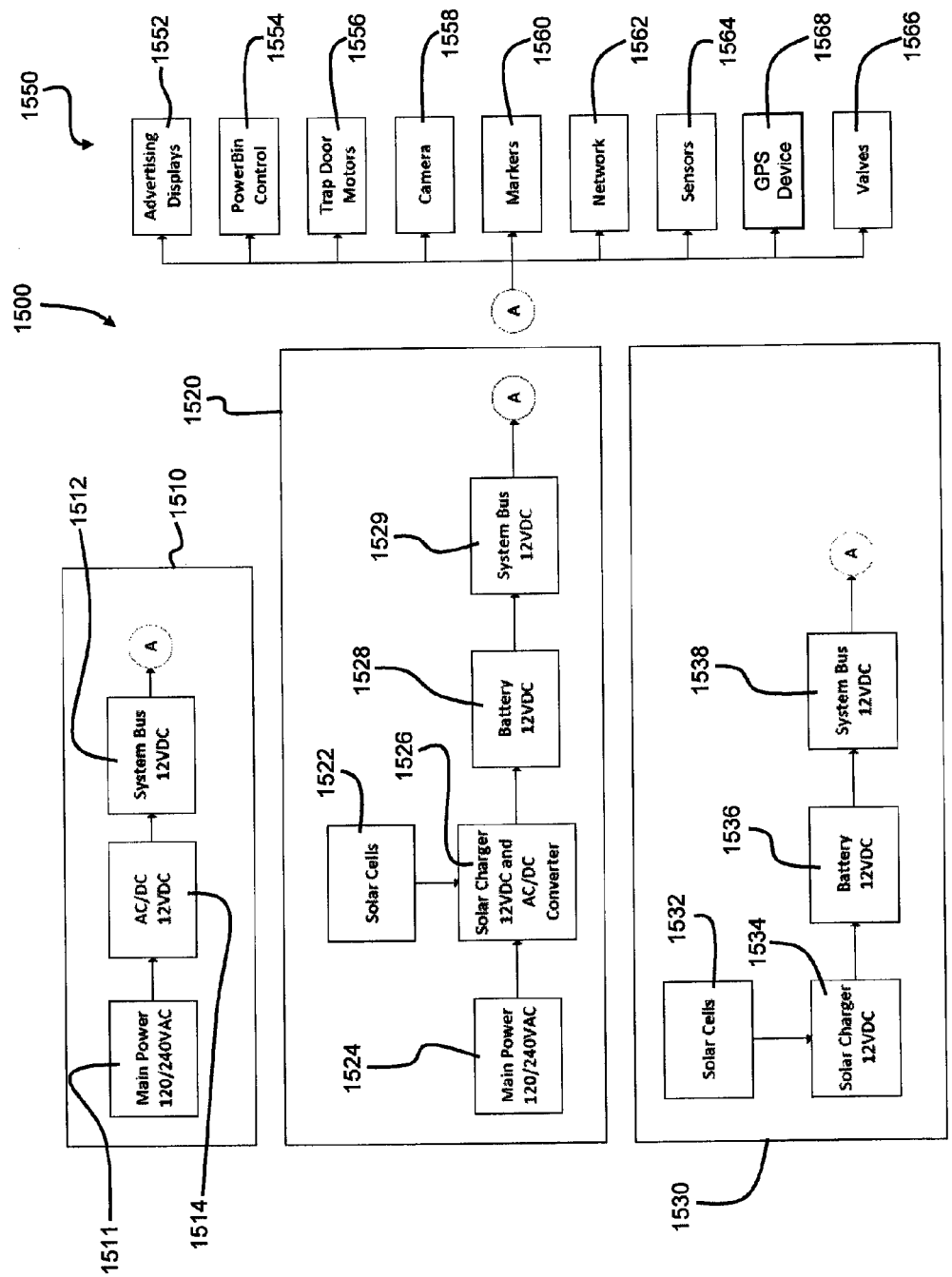
FIG. 15 is a schematic diagram of different power systems.

A flowchart 1500 shows the electrical components of the present disclosure in FIG. 15. In the flowchart 1500, one of a first, second, or third power configuration 1510, 1520, 1530 can be used provide power to several electrical systems 1550. The electrical systems 1550 may include at least one display 1552, controller 1554, motor 1556, camera 1558, marker 1560, network assembly 1562, sensor 1564, valve 1566, and GPS device 1568 among other things.

In the first power configuration 1510, a main power source 1511 can be electronically coupled to a system bus 1512 through an AC/DC converter 1514. The main power source 1511 can be a conventional power source that is accessible through a basic power grid. The main power source 1511 can be supplied through a power chord (not shown) connected to the AC/DC converter 1514. In this embodiment, the main power source 1511 may provide an AC-type power source. The AC/DC converter 1514 may convert the main power source 1511 from an AC-type power source to a DC-type power source that is compatible with the system bus 1512. Once the system bus 1512 is supplied powered, it may provide power to the electrical systems 1550 as needed.

The second power configuration 1520 may provide for supplemental power through solar cells 1522. In this configuration, a main power source 1524 may be connected to a local power grid through a power chord. The main power source 1524 may electrically couple the local power grid to a solar and AC/DC converter/charger 1526. When the main power source 1524 is supplying power, the converter/charger 1526 may convert the local power source to a battery charge power prior to sending the charge power to a battery 1528. The battery 1528 may remain in a fully charged state when the main power source 1524 is coupled to the local power source.

The second power configuration 1520 may also charge the battery 1528 through the solar cells 1522 when the main power source 1524 is not providing power. In this configuration, the solar cells 1522 may be exposed to solar energy. The solar energy is captured by the solar cells 1522 and sent to the converter/charger 1526. The converter/charger 1526 may convert the energy collected by the solar cells 1522 into the charge power that is sent to the battery 1528. The solar cells 1522 may provide supplemental charge power to charge the battery 1528. The battery 1528 may further provide the stored power to a system bus 1529. Finally, the system bus 1529 may distribute power to the electrical systems 1550 as needed.

In the third power configuration 1530 the power source may be charged exclusively by solar cells 1532. In this power configuration 1530, the solar cells 1532 may be electrically coupled to a solar charger 1534. The solar charger 1534 may also be electrically coupled to a battery 1536. The solar cells 1532 may provide solar energy to the solar charger 1534. The solar charger 1534 may convert the solar energy into charge power before sending it to the battery 1536. The battery 1536 may then be electronically coupled to a system bus 1538, which supplies power to the electrical systems 1550 as needed.

One skilled in the relevant art would understand how a plurality of variations based on the first, second, and third power configurations 1510, 1520, 1530, could be used. For example, the main power source 1511, 1524 could be electronically coupled to a plurality of different power sources. In one example, the main power source may be electronically coupled to a 120 volt alternating current source as is common in the United States. In yet another embodiment, the main power source may be electronically coupled to a 230 volt alternating current source as is common in the United Kingdom. Further, the voltage supplied to the system bus 1512, 1529, 1538 may be a plurality of types and voltages. One skilled in the relevant art would understand how a plurality of voltage sources and outputs can be converted to supply power to different electrical system. Accordingly, this disclosure should not be limited to any one power configuration.

Figure 16A:
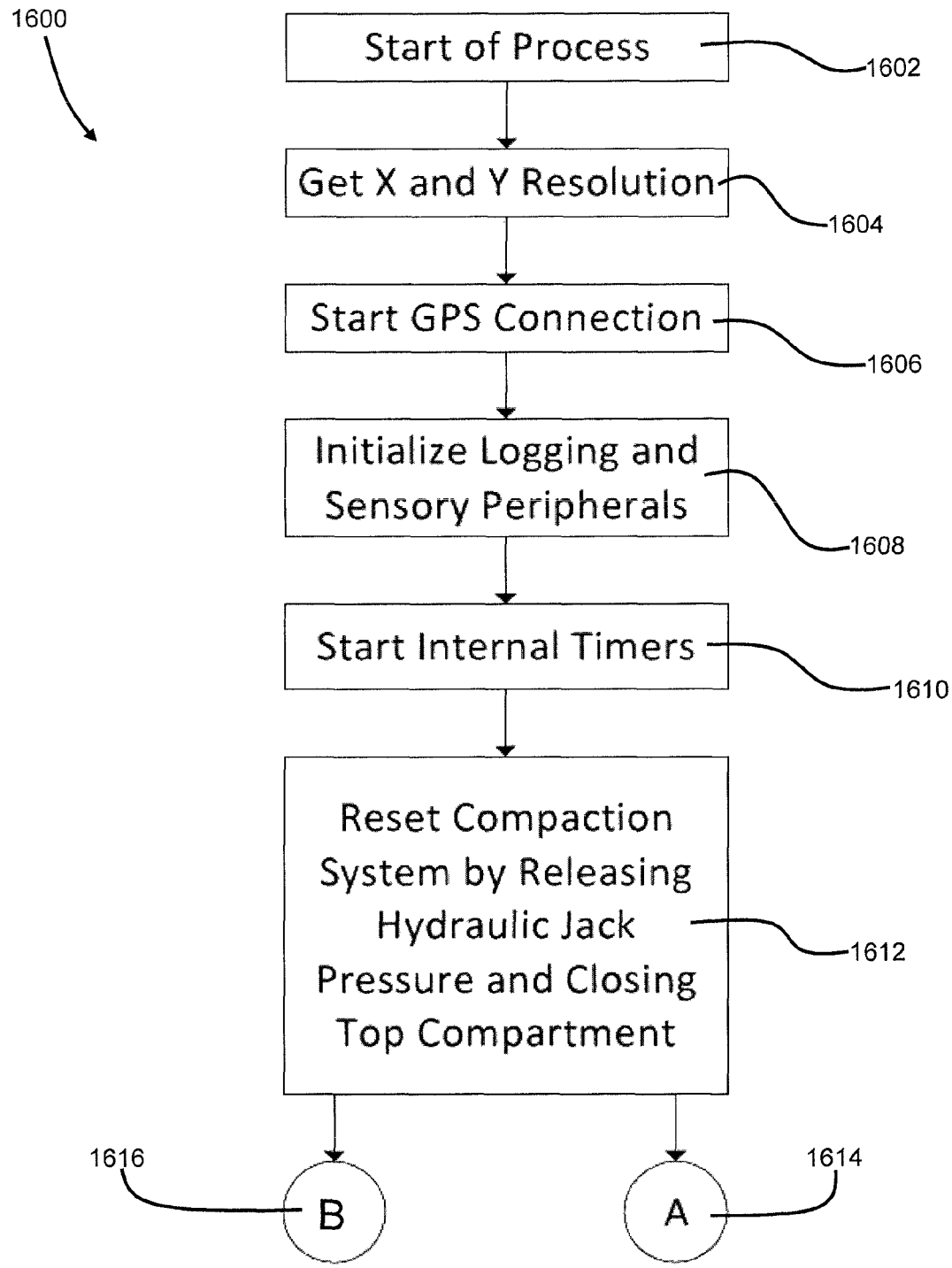
FIG. 16a is a logic flowchart for a control system.

While the system bus 1512, 1529, 1538 may provide electrical power to the electrical systems 250, the controller 1554 may also be in communication with the electrical systems 250. Referring now to FIG. 16*a*, an initial controller logic flowchart 1600 is shown. Block 1602 may be initiated to start the overall logic process of the controller 1554. Block 1602 may start when the controller 1554 is first supplied power. In one embodiment, there may be a power switch that may be engaged by a user to start the process of block 1602. In yet another embodiment, block 1602 may be initiated remotely by a user through the network 1562.

Once the start process of block 1602 is initiated, block 1604 may utilize the controller 1554 to determine the screen resolution of the displays 1552. Block 1606 may be simultaneously, or otherwise, executed with block 1604. In block 1606, the controller 1554 may communicate with the GPS device 1568 to determine the status of the GPS device 1568 connection and the location of the receptacle 500. In block 1608, data logging mechanisms and external sensors 1564 are initialized. In block 1610, the controller 1554 starts internal timers to set the intervals for which the controller 1554 will report and receive data through the network 1562. Block 1612 may be initiated by the controller. In block 1612, the valve 1566 may be transitioned to a lowering position to allow the hydraulic lift assembly 602 become oriented in the lowered position. During block 1612, the motors 1556 may be engaged to transition the first and second paddles 818, 820 to the closed position 822.

Figure 16B:
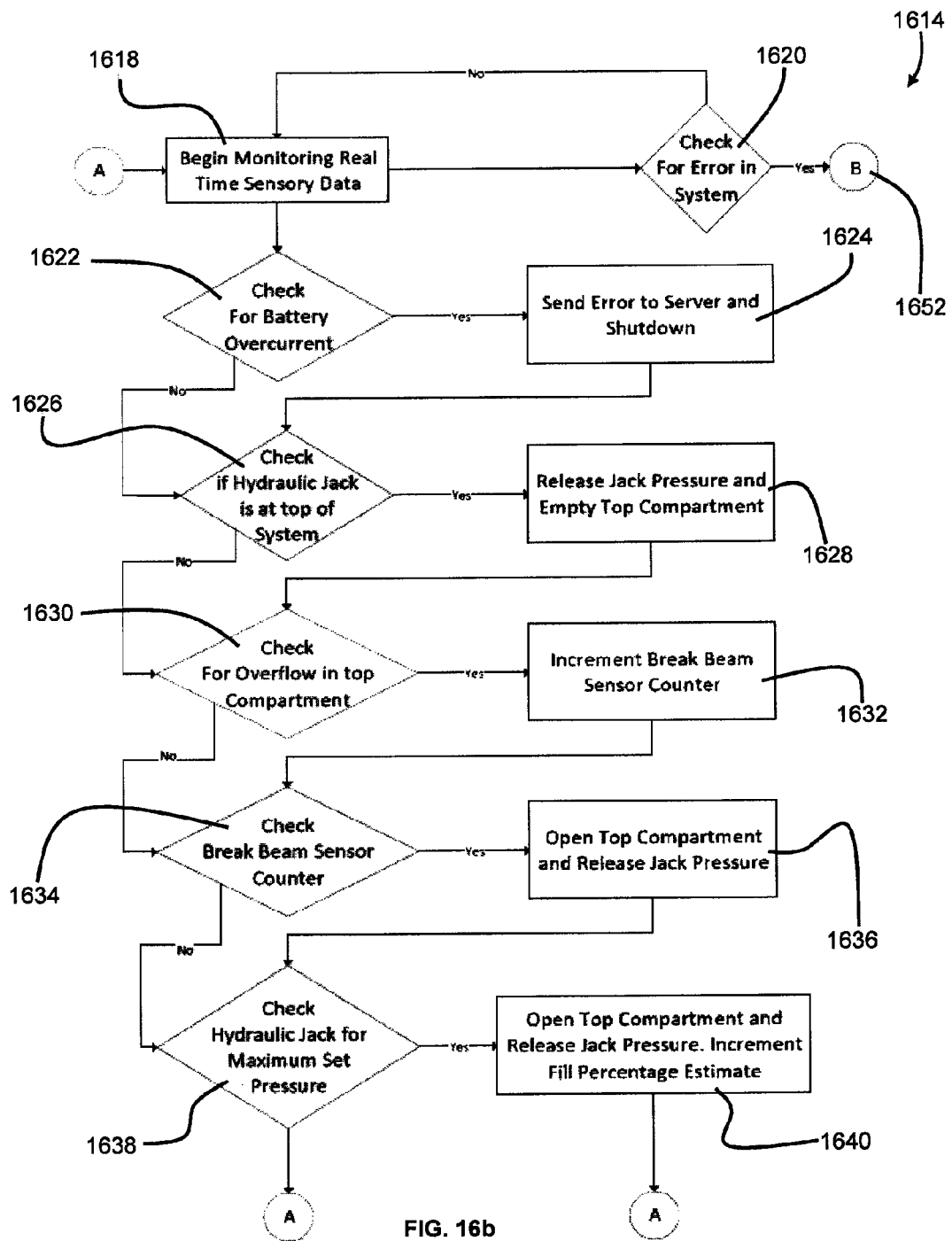
Figure 16C:
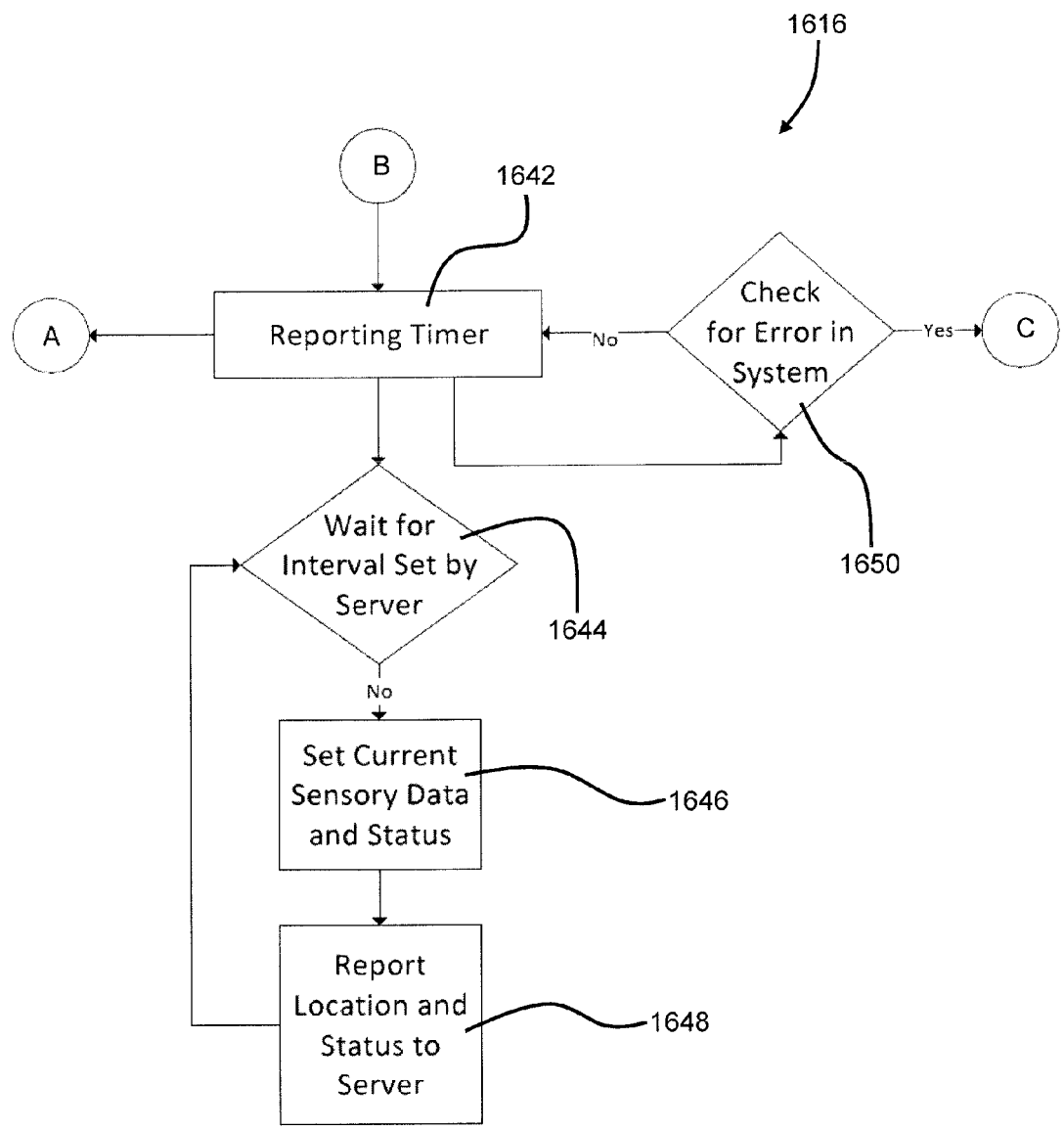

After block 1612, the controller 1554 initiates a first process 1614 (FIG. 16*b*) and a second process 1616 (FIG. 16*c*). The first process 1614 may, in part, monitor the electrical systems 1550 while the second process 1616 may communicate with external components through the network 1562.

Figure 16D:
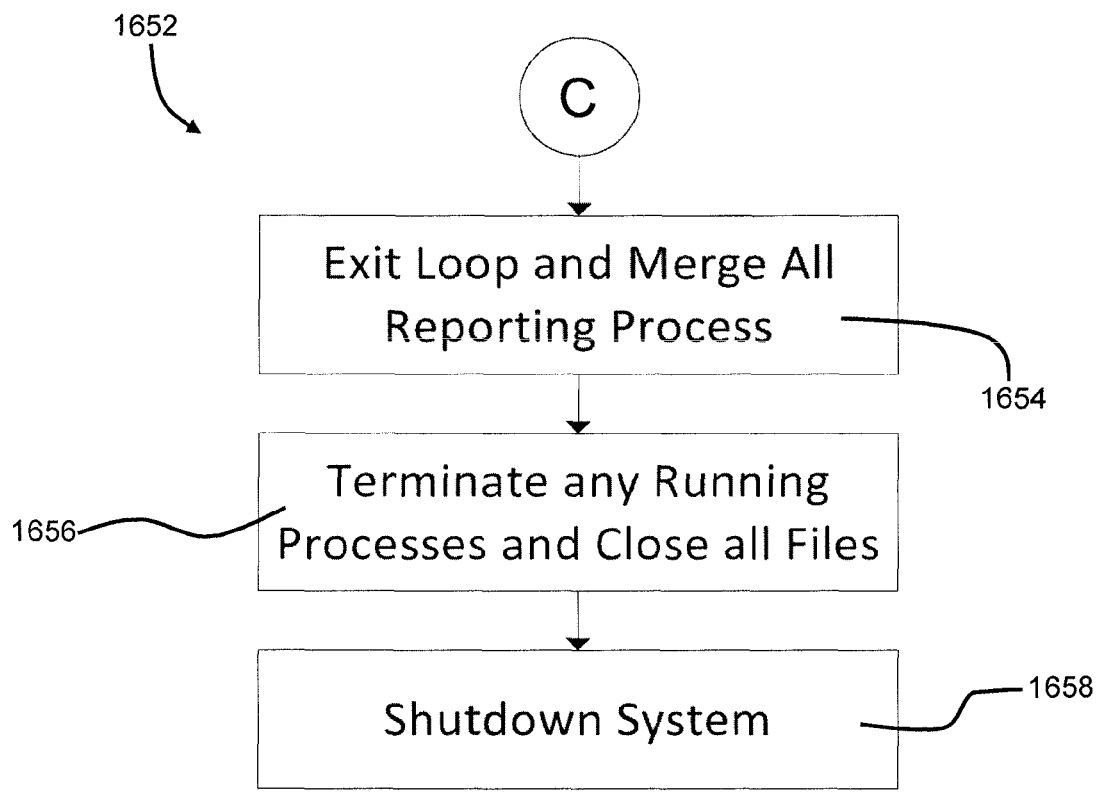

The first process 1614 may begin at block 1618, where the data from the electrical systems 1550 is monitored. Throughout the monitoring of block 1618, the system will be checked for errors in block 1620. If there is no error detected in 1620, the controller 1554 will continue to monitor the electrical systems 1550. If there is an error detected in 1620, the controller 1554 will initiate a third process 1652 (FIG. 16*d*). While block 1618 is monitoring the electrical systems 1550, in block 1622 the power input into the controller 1554 may be monitored. Block 1622 may monitor the battery 1528, 1536, to determine if battery overcurrent has occurred. Block 1622 may also monitor the electrical properties of the main power source 1511, 1524, the converter 1514, 1526, 1534, and the solar cells 1522, 1532 to ensure the electrical components are functioning normally. If block 1622 determines everything is functioning properly, the controller 1554 may move to block 1626. If the controller determines there was an issue found in block 1622, block 1624 may be initiated. In block 1624, if battery overcurrent has occurred, the controller 1554 may send an error communication through the network 1562 and shut down the receptacle 500. If a different error was detected in block 1622, the controller 1554 may send an error message through the network 1562.

The controller 1554 may also be simultaneously executing block 1626. In block 1626, the first and second sensors 1014, 1016 may be monitored to determine whether the hydraulic lift assembly 602 is in a top position. If in block 1626 the controller 1554 determines that the hydraulic lift assembly 602 is in the top position, the controller may execute block 1628. In block 1628, the controller 1554 may release the control valve 1108 and allow the hydraulic lift assembly 602 to transition to a bottom position. During block 1628, the controller 1554 may send a signal to the motors 1556 to transition the first and second paddles 818, 820 to the opened position.

Block 1630 may also be simultaneously performed by the controller 1554. In block 1630, the controller 1554 may monitor one of the sensors 1564 to determine if an overflow condition has occurred. In one embodiment, block 1630 may monitor a break beam sensor (not shown) to determine whether the overflow condition has occurred. If the overflow condition has occurred, the controller may move to block 1632 to increment a break beam sensor counter. The counter of block 1632 may be used by the controller 1554 to determine how long the overflow condition has occurred.

In block 1634, the controller 1554 monitors the counter of block 1632 to determine if a threshold timer value has been met. If the threshold timer value has been met, the controller executes block 1636, where the motors 1556 are engaged by the controller 1554 to transition to the opened position and the control valve 1108 is transitioned to the release orientation where the hydraulic lift assembly 602 can transition to a lowered position.

In block 1638, the controller 1554 may monitor one of the sensors 1564 to determine if the hydraulic lift assembly 602 is generating too much hydraulic pressure. In one embodiment of block 1638, the pressure transducer in the control valve 1108 is used to determine hydraulic pressure. If the hydraulic pressure determined in block 1638 is too high, the controller may implement block 1640. In block 1640 the controller may engage the motors 1556 to transition to the opened position and the control valve 1108 may be transitioned to the release orientation where the hydraulic lift assembly 602 can transition to a lowered position. In block 1640, a fill percentage modifier may be implemented when a fill percentage is calculated.

Each of the blocks in the first process 1614 may be monitored either simultaneously or in any sequence. Further, each of the blocks may be monitored continuously while the controller 1554 has power.

Referring now to the second process 1616 shown in FIG. 16*c*. In a first block 1642, a reporting timer may be initiated by the controller 1554. The reporting timer in block 1642 may be referenced during block 1644 to determine if a waiting interval has been met by the reporting timer. The waiting interval may be previously defined in the controller 1554. During the waiting interval of block 1644, the controller 1554 may execute block 1646 and obtain information from the electrical systems 1550 and format the data to be output as a pre-set format. After the waiting and formatting blocks 1644, 1646 have been completed, the controller 1554 may send the data through the network 1562 to a desired location in block 1648. After the data has been sent in block 1648, the waiting interval may be reset and blocks 1644, 1646, and 1648 may be repeated.

During the second process 1616, block 1650 may continuously check the second process 1616 for any errors. If the controller 1554 detects any errors during block 1650, it may initiate the third process 1652. If the controller 1554 does not detect any errors in block 1650, the remaining blocks of the second process 1616 will continue to be executed by the controller 1554.

If the controller 1554 ever detects a fatal error, the third process 1652 may be executed. In the third process 1652, the controller 1554 may seize to perform the first and second process 1614, 1616 in block 1654 and merge all obtained data into a shutdown process. In block 1656, the controller 1554 may close any running process or opened files. Finally, in block 1658, the controller 1554 may shut down the electrical systems 1550.

While the controller 1554 has been described throughout as performing many of the functions for the controller logic flowchart 1600, one skilled in the art will understand that a plurality of methods could be used to execute the logic steps described above. More specifically, multiple controllers could be used. Each controller could be in electrical communication with the other and each controller could execute different blocks of the logic flowchart. There could also be no controller on the receptacle 500 at all. Rather, the network 1562 could communicate with an external source to control the electrical systems 1550. In yet another embodiment there may be no logic flowchart at all. In this embodiment, the network 1562 could communicate with a user interface to show the status of the electrical systems 1550. A user could then control the electrical systems 1550 by sending commands through the network 1562.

The network 1562 may provide a plurality of wireless signal interfaces for transferring data. The network 1562 may provide standard wireless protocols such as Bluetooth, Wi-Fi, cellular signals, and the like. Further, the network 1562 may be wired to a local area network. The network 1562 may also communicate with other receptacles 500 that are located within the receptacles wireless range. In one embodiment, the receptacle 500 may be connected to a local area network that provides a high-speed connection to the internet. The receptacle could be wirelessly connected to other receptacles within wireless range of one another. The high-speed connection could be shared by all of the receptacles 500 wirelessly. Further, a user could stay within the wireless range of the plurality of receptacles 500 and seamlessly obtain the high-speed internet connection through wireless connectivity to the plurality of receptacles 500.

Figure 17:
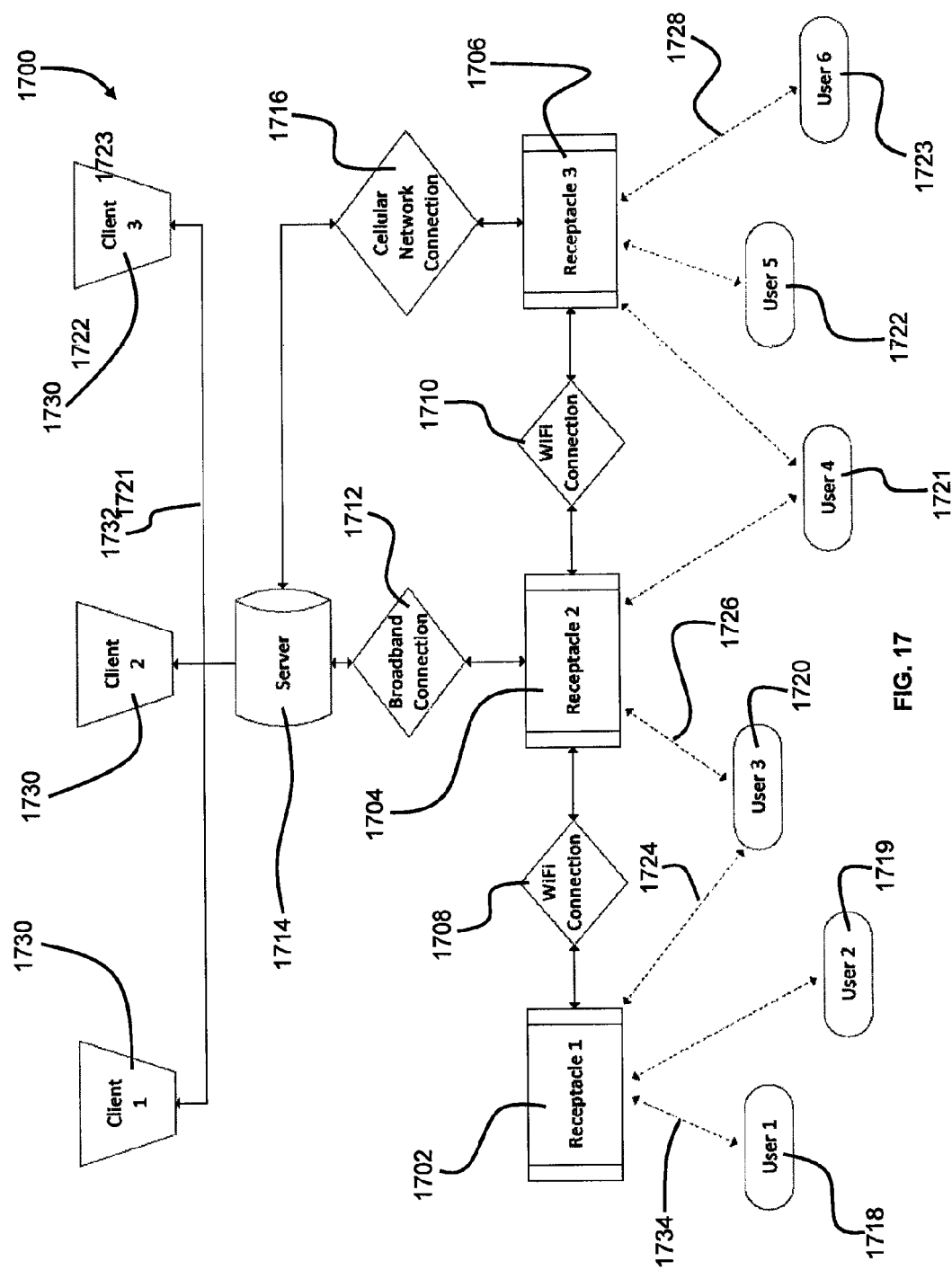
FIG. 17 is a schematic view of a data transfer network from a user to a client.

Referring now to FIG. 17, one embodiment of a network configuration 1700 is shown in schematic form. In this nonexclusive embodiment, a first, second, and third receptacle 1702, 1704, 1706, may be in wireless communication with one another through a first and second wireless connection 1708, 1710. The second receptacle 1704 may provide for a high-speed data connection 1712. The data connection 1712 may be a wired connection such as Ethernet, cable, fibre optics, or the like. The data connection 1712 may allow the second receptacle to communicate with a server 1714. The server 1714 may contain information that may be transmitted to the second receptacle 1704 through the data connection 1712. Further, the second receptacle 1704 may provide the server 1714 with updated information regarding the electrical systems 1550 of the second receptacle 1704.

In one embodiment, the first receptacle 1702 may be connected to the second receptacle 1704 through the first wireless connection 1708. In this embodiment, the first receptacle 1702 may access the data connection 1712 through the first wireless connection 1708 with the second receptacle 1704. The first receptacle 1702 may also communicate with the server 1714 through the data connection 1712.

In another embodiment, the third receptacle 1706 may have the second wireless connection 1710 to the second receptacle 1704 and also have a cellular connection 1716 directly to the server 1714. The cellular connection 1716 may allow the third receptacle 1706 communicate with the server 1714 through standard cellular data transfer protocols. The third receptacle 1706 may also communicate with the server 1714 by accessing the data connection 1712 of the second receptacle 1704 through the second wireless connection 1710. In this embodiment, the third receptacle 1706 may communicate with the server 1714 through the cellular connection 1716 and/or the second wireless connection 1710. In one aspect of this embodiment, the third receptacle 1706 may determine whether the second wireless connection 1710 or the cellular connection 1716 provides the best connection for transferring/receiving data. In yet another aspect, the third receptacle 1706 may utilize both the second wireless connections 1710 and the cellular connection 1716 to transfer/receive data simultaneously.

In one non-limiting embodiment of the present disclosure, a plurality of users 1718-1723 may access a network through the receptacles 1702, 1704, 1706. In this embodiment, the user 1718 may be within wireless range of the first receptacle 1702. The user may then connect a wireless device (not shown) to a third user connection 1734 supplied by the first receptacle 1702. The user 1718 may also access the data connection 1712 and the server 1714 because of the first receptacles 1702 first wireless connection 1708 with the second receptacle 1704 as described in more detail above.

In another non-limiting embodiment, the user 1720 may be wirelessly connected to both the first receptacle 1702 and the second receptacle 1704. In this embodiment, the user 1720 may wirelessly access the data connection 1712 either through the first receptacle 1702 via a first user connection 1724, or the second receptacle 1704 via a second user connection 1726. Alternatively, the user could use both receptacles 1702, 1704 simultaneously. In this embodiment, the user 1720 will ultimately gain access to the data connection 1712 through the second receptacle 1704. However, if the user 1720 has a stronger first user connection 1724, the user may gain access to the data connection 1712 through the first receptacle 1702 as described in more detail above. Further, the user 1720 may gain access to the data connection 1712 through both the first and second user connection 1724, 1726.

In yet another non-limiting embodiment, the user 1723 may connect wirelessly to the third receptacle 1706 through a third user connection 1728. The third user connection 1728 may allow the user 1723 to utilize the network connections of the third receptacle 1706. In one embodiment, the user 1723 may gain access to the cellular connection 1716 through the third receptacle 1706. The user 1723 may transfer/receive data through the cellular data protocols used by the third receptacle 1706. Alternatively, the user 1723 may transfer/receive data through the data connection 1712 provided through the third receptacle's 1706 second wireless connection 1710 with the second receptacle 1704.

At least one user 1730 may access the server 1714 through a data connection 1732. The user 1730 may be provided with login information to gain access to the server 1714. Once the user 1730 has accessed the server 1714, the user 1730 may send/receive information to/from the plurality of receptacles 1702, 1704, 1706. The user 1730 may monitor the receptacles to determine whether any errors have occurred, the level of refuse deposited therein, the information displayed on the displays 1552, or view images produced by the camera 1558 among other things. The user 1730 may also provide instructions to the plurality of receptacles 1702, 1704, 1706, in order to control their functionality. In one embodiment, the user 1730 may send information to be shown on the displays 1552. In yet another embodiment, the user 1730 may remotely shut down a receptacle through the server 1714.

The server 1714 may also send notification information to the user 1730. In one nonlimiting example, the server 1714 may send the user 1730 a notification of an issue with a receptacle. In that case, the server 1714 may provide notice in the form of an email, a text message, an automated phone call, a notification on a control application, and/or any other form of communication that would be noticed by the user 1730.

One skilled in the art will understand that there is a plurality of ways to obtain data connectivity both wirelessly and through a local area network. Further, a person having skill in the relevant art understands that there is a plurality of ways to wirelessly mesh a plurality of wireless devices to share a data connection. One example of a system that could be used to provide part of the network 1562 is "AirTight Wireless Mesh" as provided by AirTight Networks, Inc. The Airtight system allows certain wireless access points to be wirelessly connected to one another to share one or more wired network connections. One skilled in the art understands that there are many ways to achieve a wireless mesh to share a hardwired network connection and this application should not be limited to any particular one.

In one embodiment, the camera 1558 may be mounted on the front side assembly 506. The camera 1558 may be oriented in a plurality of directions. Further, there may be more than one camera 1558 located on the receptacle 500. In one embodiment, there is a plurality of cameras 1558 located about the receptacle 500 so that they may be combined to show a substantially 360 degree view about the receptacle 500.

The cameras 1558 may be mounted to an external surface of the receptacle 500. In this embodiment, a bracket may couple the camera 1558 to the receptacle 500. The camera 1558 may transmit video data to the receptacle 500 either wirelessly through the network 1562 or through a wireless connection to the controller 1554. In a different embodiment, the cameras 1558 may be mounted in the interior region 520 behind one or more panels of the receptacle 500. In this embodiment, there may be a hole in the panel that is sufficiently sized and located to allow an unobstructed view from the camera 1558 to the surrounding area. The hole in the panel may also be covered or otherwise sealed with a clear member such as glass or any other similarly transparent material. The glass may keep moisture or other external forces from harming the camera 1558 while still allowing the camera 1558 to record images from the surrounding area.

A person having skill in the relevant art will understand the plurality of camera systems and mounting options that could be utilized on the receptacle 500 and this disclosure should not be limited to any particular embodiment.

In a different embodiment, the cameras 1558 may further provide a security monitoring feature. In this embodiment the cameras 1558 may record both audio and video from the environment surrounding the receptacle. The cameras 1558 may be programmed to send an alert if certain conditions are met. In one aspect of this embodiment, the cameras 1558 may send an alert if an audio input is recorded that corresponds to expected audio inputs for a gunshot. In another embodiment, the cameras 1558 may use face-recognition to determine whether a targeted person has been in the area. In yet another embodiment, the cameras 1558 may be programmed to send an alert when a dangerous weapon, such as guns, is observed. In one embodiment, a system such as SmartWitness™ may be used along with the cameras 1558.

Figure 18:
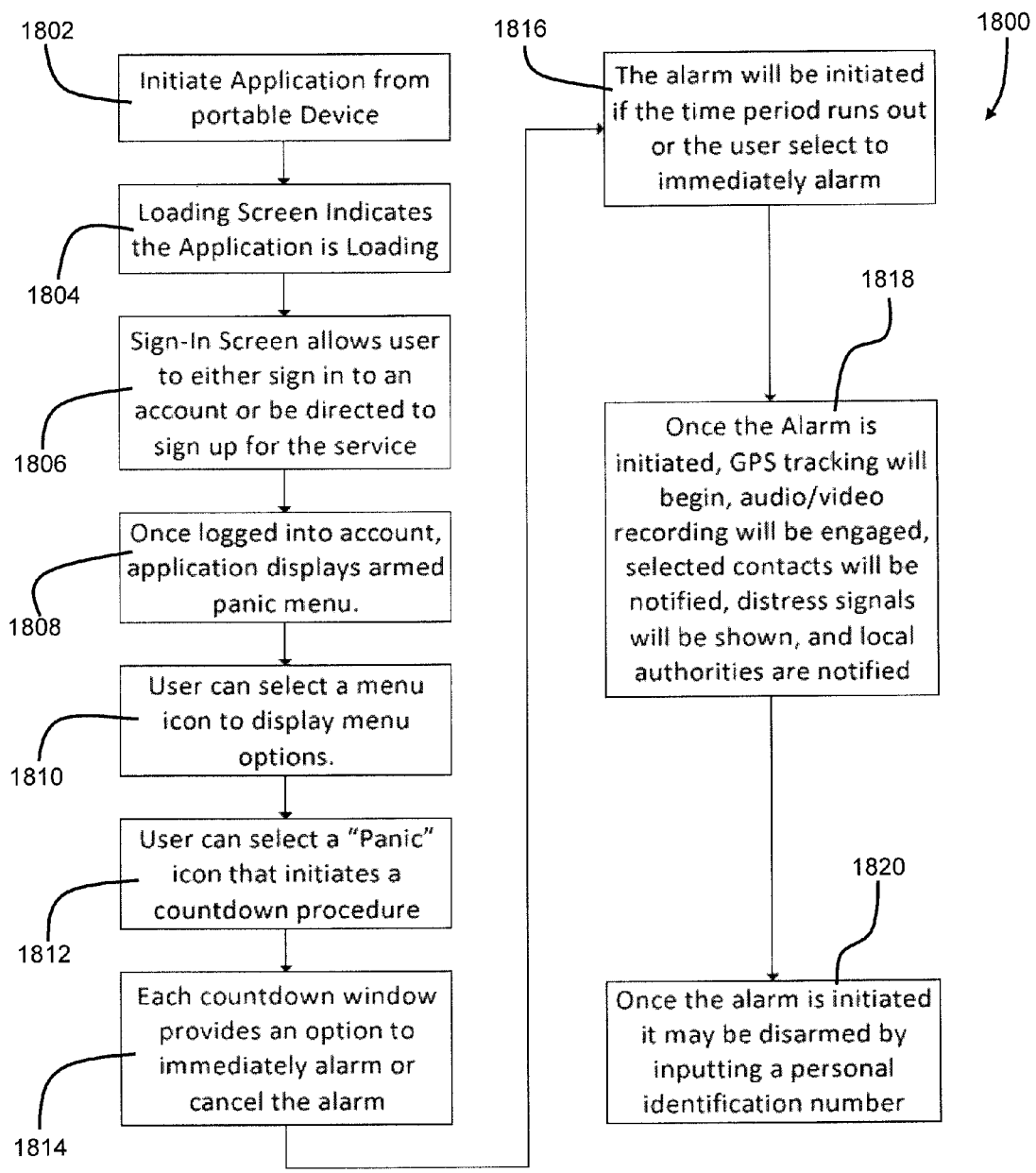
FIG. 18 is a schematic flowchart for an application that allows users to send a distress signal.

Referring now to FIG. 18, a flowchart 1800 is shown that allows a user to communicate a distress signal to a plurality of sources. The flowchart 1800 may be implemented by a portable device that can communicate with a plurality of sources. In block 1802, the user may initiate an application by selecting an icon from a screen. After the user has selected the icon in block 1802, a loading screen may indicate that the application is loading in block 1804. After the loading block 1804 is complete, a sign-in screen of block 1806 may be shown. The sign-in screen of block 1806 may provide the user with an option to log in to a previously setup account or it may also provide the user with an option to create an account to use the application. After the user has logged in at block 1806, the application may display an armed panic menu in block 1808. The armed panic menu of block 1808 may be a panic icon that can be selected by the user. In addition to the armed panic menu of block 1808, the application mar also have an icon that can be selected by the user to enter the menu options in block 1810.

If the user selects the panic icon of block 1808, block 1812 may initiate a countdown sequence. Once the countdown sequence is initiated in block 1812, a countdown window may show the remaining time in the countdown and provide for an option to immediately send an alarm or immediately disarm the application in block 1814. If the countdown of block 1814 is completed or the user initiates the alarm, block 1816 will initiate an alarm. Once the alarm is initiated in block 1816, block 1818 may activate several protective features, such as; sounding an audible alarm, tracking location with any available GPS data, enabling any available audio or video recording, notifying pre-selected contacts, showing distress signals, and notifying local authorities. Finally, in block 1820, the alarm can be disabled by inputting a personal identification code pre-set by the user.

In one non-exclusive embodiment of the protective features of block 1818, the receptacle 500 may be utilized to provide a supplemental alert. For example, the displays 1552 that are located within a certain proximity to the user may flash and/or display an alert message. Further, the camera 1558 on the receptacle 500 may begin recording upon receiving the alarm signal of block 1818. The markers 1560 may also flash or provide a visual distress signal indicating that the alarm signal was received. Further, the GPS device 1568 of the receptacle may provide information regarding the location of the alarm signal.

Figure 19:
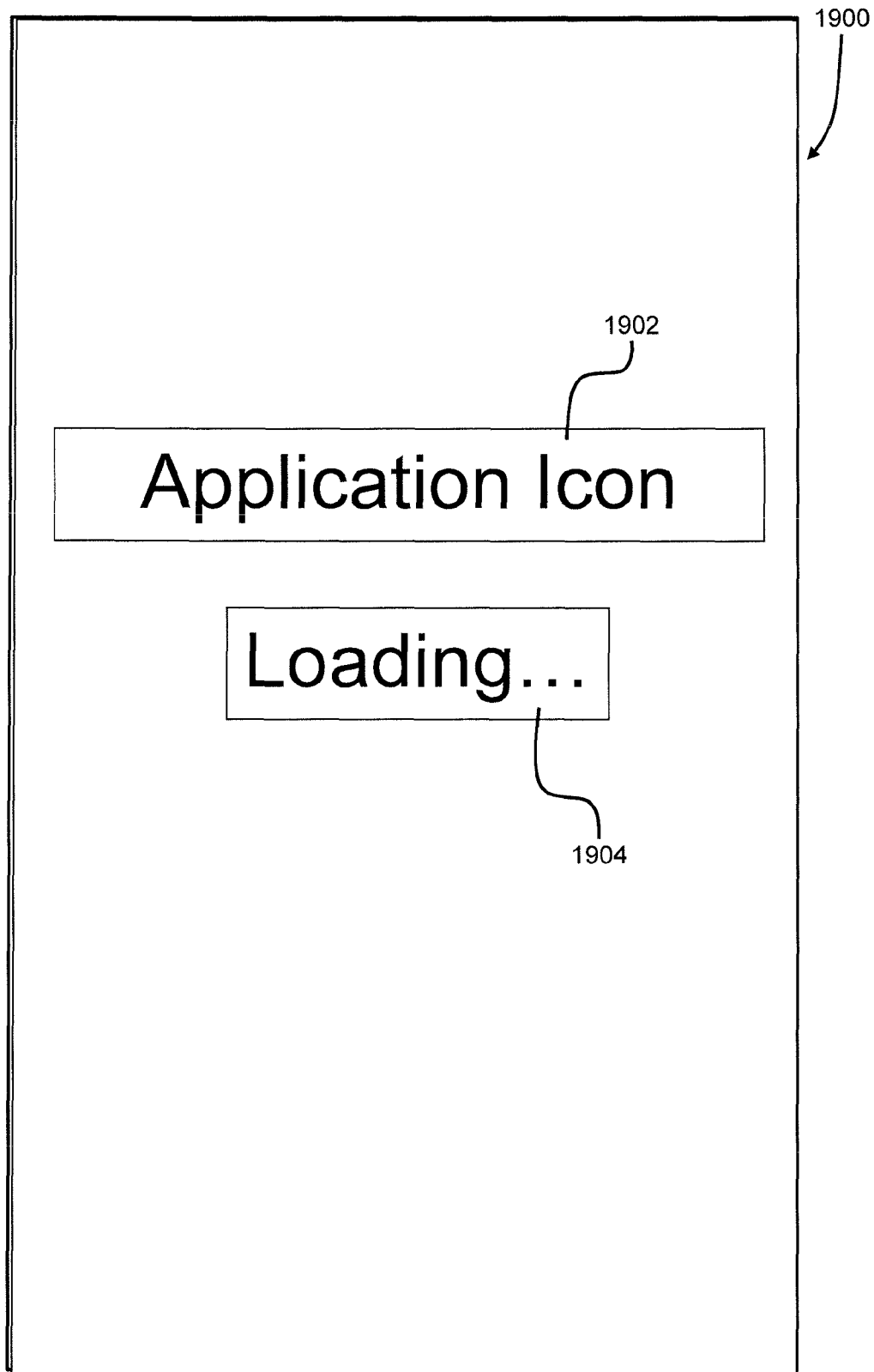
FIG. 19 is a wireframe view of a loading screen of the application of FIG. 18.

One embodiment of a loading screen 1900 from block 1804 is shown in FIG. 19. The loading screen. 1900 may display an application icon 1902 and a loading status indicator 1904. The application icon 1902 can display various graphics indicating the program that is loading. Further, the load status indicator 1904 may provide a visual indication that the application is being loaded on the portable device.

Figure 20:
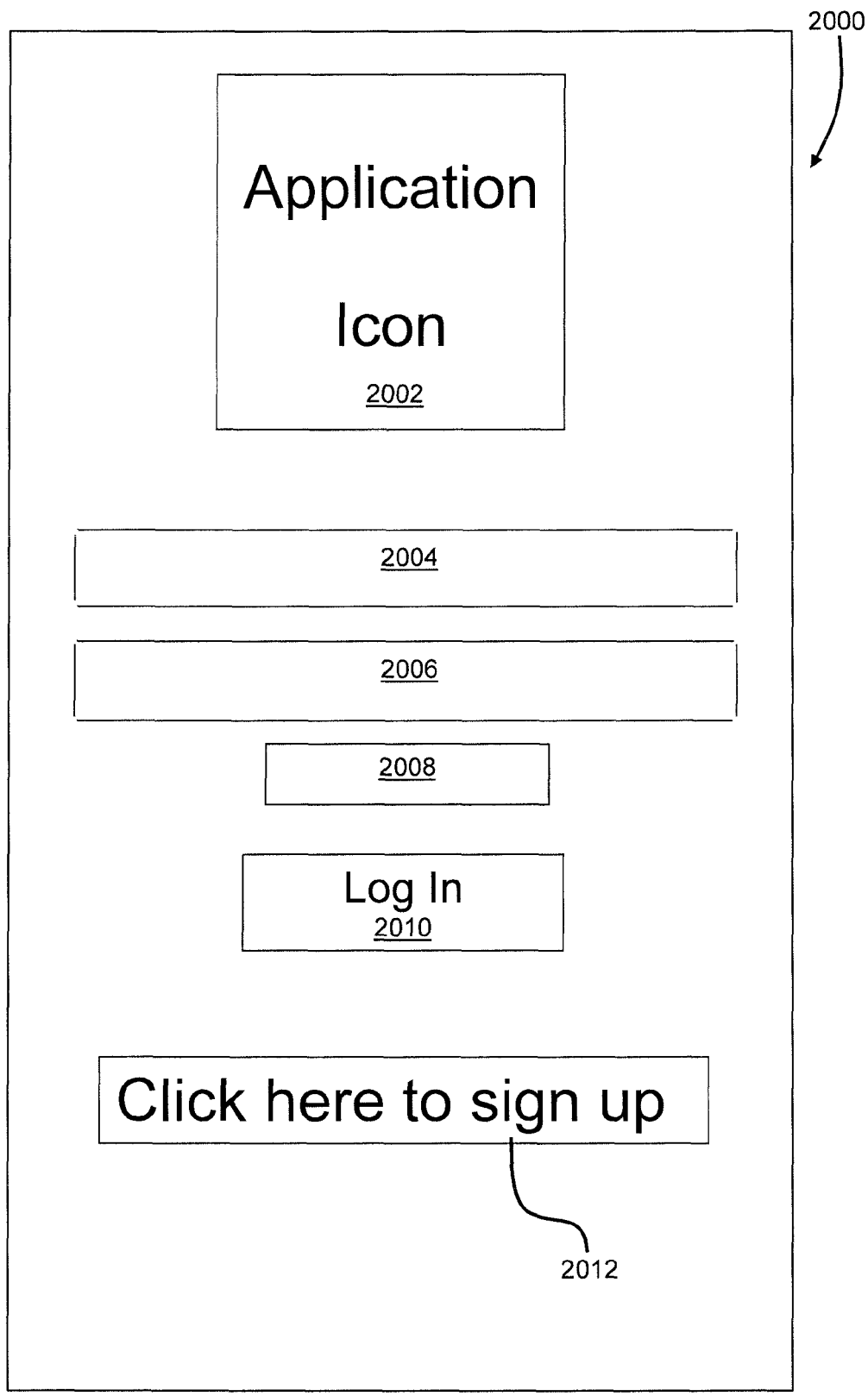
FIG. 20 is a wireframe view of a sign-in screen of the application of FIG. 18.

A sign-in screen 2000 is shown in FIG. 20. Once the loading process of block 1804 is complete, the device may show the sign-in screen 2000 while executing block 1806. The sign-in screen 2000 may display an icon 2002 indicating the application being run. The sign-in screen 2000 may also have a location for the user to put in a sign-in name 2004 and a sign-in password 2006. A first link 2008 may provide the user with assistance if the sign-in information has been forgotten. Once the user has input the correct sign-in information, they may select a log-in button 2010 to execute the application using the user's specific log-in credentials. Finally, a second link 2012 may be provided to allow the user to create a sign-in name and sign-in password if they do not already have one.

Figure 21:
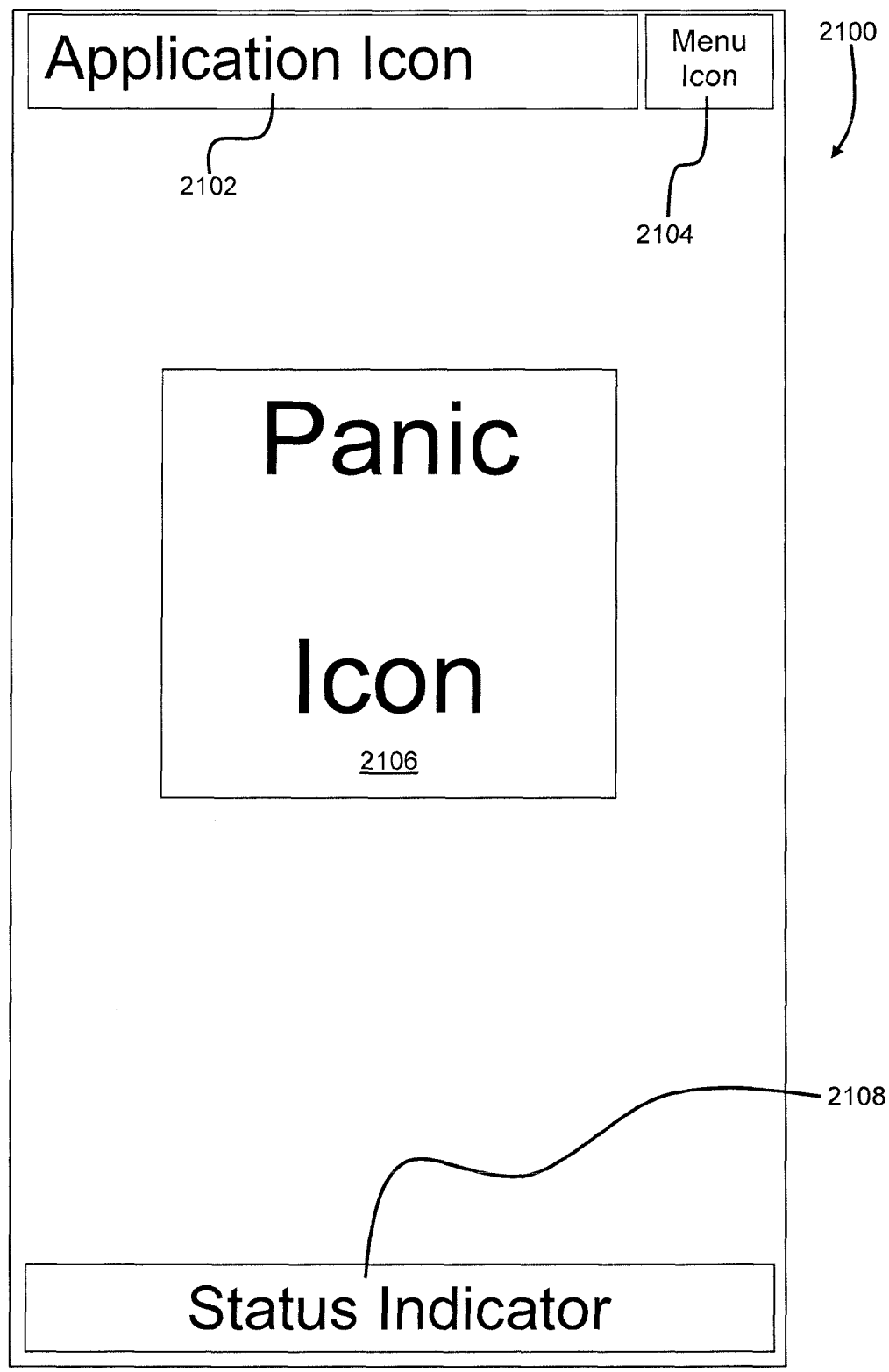
FIG. 21 is a wireframe view of a panic option screen of the application of FIG. 18.

Once the user has logged in to the application as described above and mentioned in block 1808, a panic option screen 2100 may be displayed as shown in FIG. 21. The panic option screen 2100 may display an application identifier 2102 at a top location. The application identifier 2102 may be disposed next to a menu icon 2104. The menu icon 2104 may be selected by the user to display a plurality of menu options. A panic icon 2106 may be displayed in an easily accessible location on the device. The panic icon 2106 can be selected by the user to initiate the countdown procedure as mentioned in block 1812. Further, a status indicator 2108 may be disposed at a bottom portion of the device to tell the user the status of the application (i.e., whether it is armed or unarmed).

Figure 22:
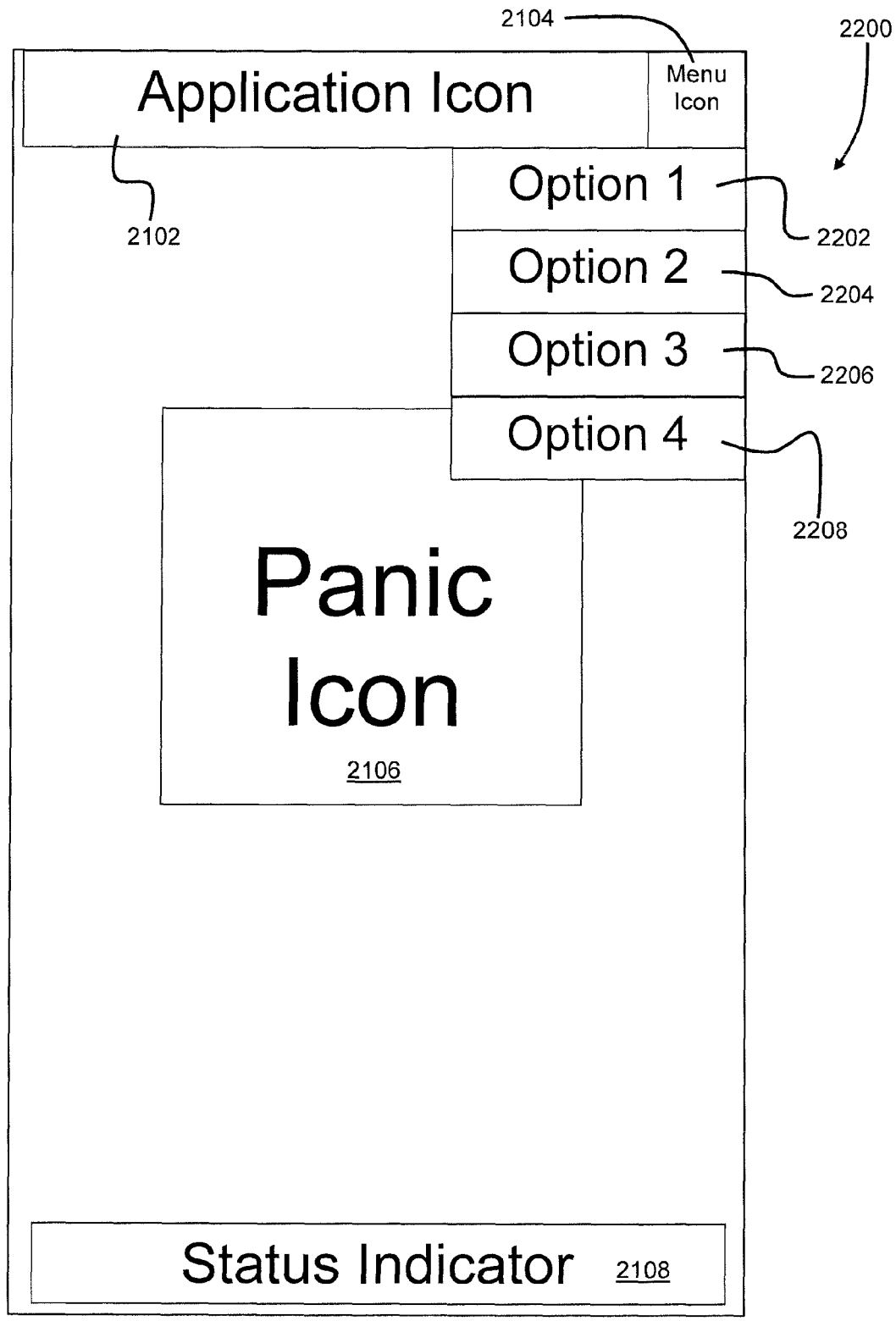
FIG. 22 is a wireframe view of a menu option screen of the application of FIG. 18.

Referring now to FIG. 22, the menu options of block 1810 are shown in an expanded state 2200. Selecting the menu icon 2104 may expand a plurality of option buttons 2202, 2204, 2206, 2208. Each of the plurality of option buttons 2202, 2204, 2206, 2208 can be individually selected by the user to open a corresponding option window. Option button 2202 may be selectable to bring the user to a profile page. The profile page may allow the user to change the specific information related to the user's account. The option button 2204 may be selectable to open a trusted contacts page. The trusted contacts page could allow the user to add or remove the contact information the user desires the application to use. The option button 2206 could be selectable to open a privacy policy page. The privacy policy page could list the specific details of the applications privacy policy with the user. Finally, the option button 2208 could be selectable to allow the user to sign out of their account.

While a set number of option buttons 2202, 2204, 2206, 2208 have been described herein, one having skill in the relevant art understands that any number of option buttons may be used. Further, while specific functions of each of the option buttons 2202, 2204, 2206, 2208 has also been described herein, one skilled in the relevant art understands that the option buttons 2202, 2204, 2206, 2208 could be configured to perform a plurality of functions not explicitly disclosed herein. Accordingly, this disclosure should not be limited to the specific functions described explicitly herein.

Figure 23:
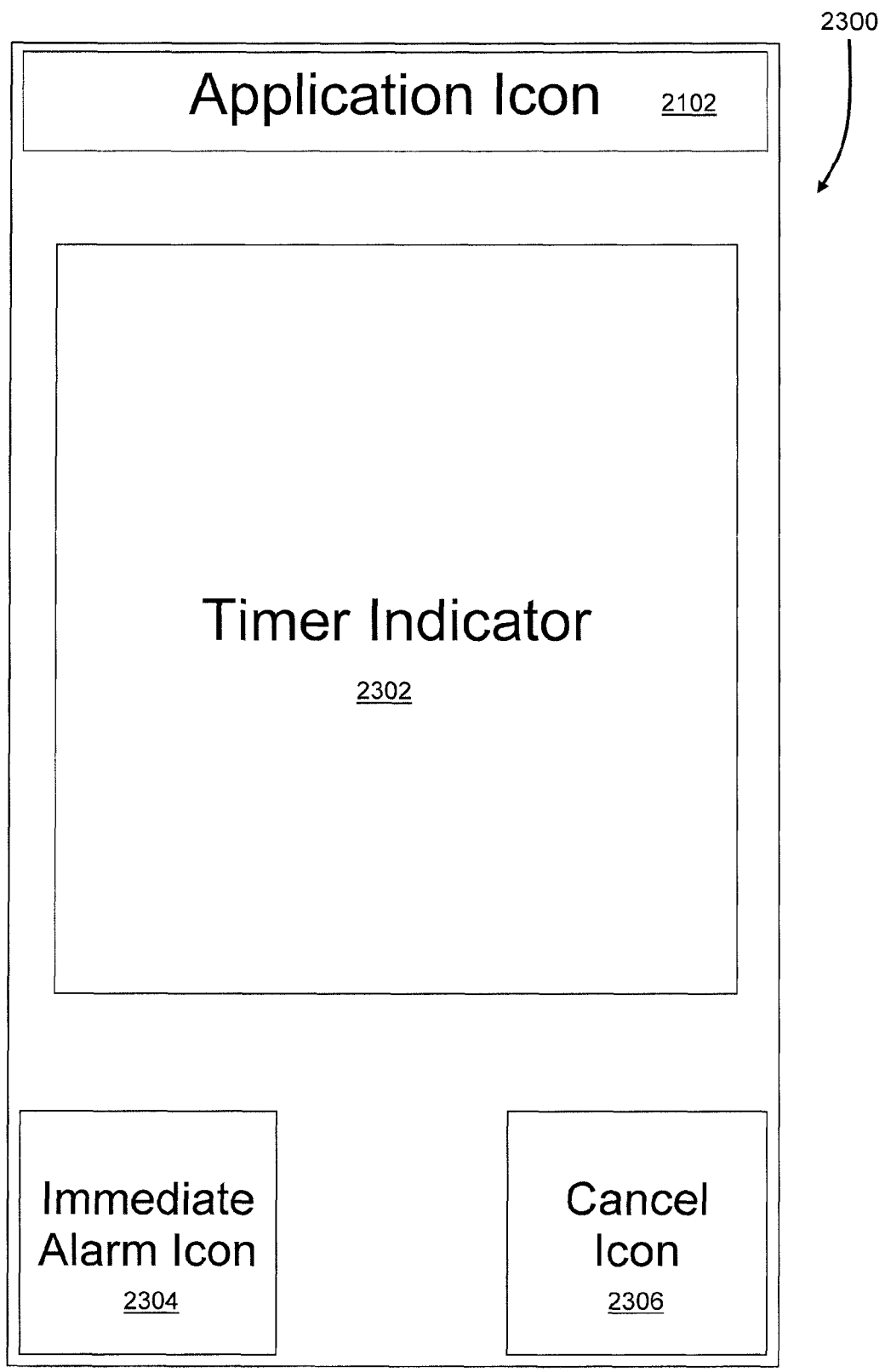
FIG. 23 is a wireframe view of a timer screen of the application of FIG. 18.

If the user selects the panic icon 2106 as described in block 1812, a timer screen 2300 may be displayed to the user as shown in FIG. 23. The timer screen 2300 may show a timer indicator 2302. The timer indicator 2302 may display a countdown until the alarm block 1818 is initiated. The user may also have the option to select an immediate alarm icon 2304. The immediate alarm icon 2304 may bypass the countdown and immediately initiate the alarm procedure of block 1818. Further, a cancel icon 2306 may be selectable by the user to cancel the countdown prior to initiating the alarm procedure.

Figure 24:
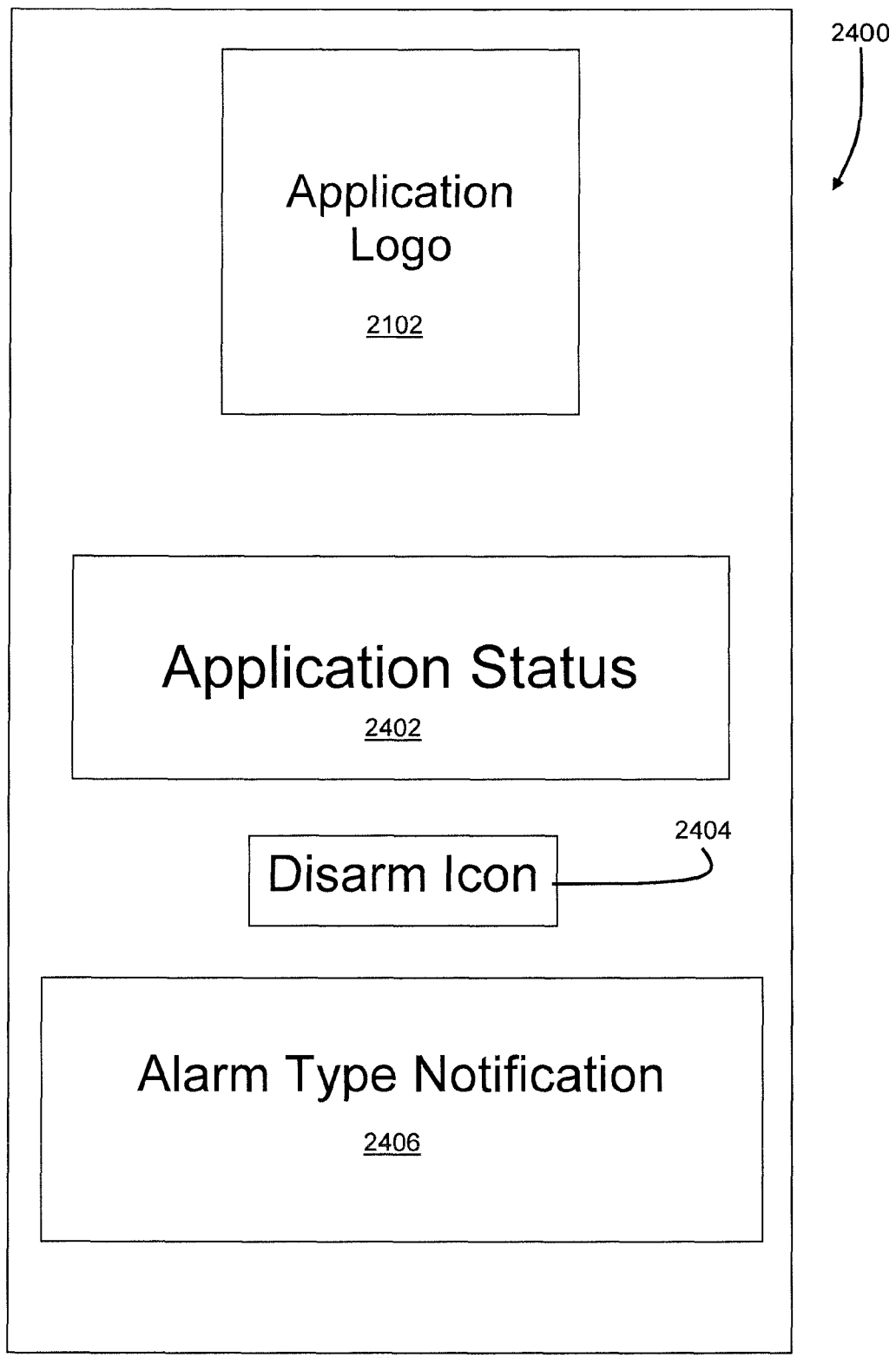
FIG. 24 is a wireframe view of a locked screen of the application of FIG. 18.

Once the alarm is initiated as described above, a locked screen 2400 may be displayed as shown in FIG. 24. The lock screen 2400 may display a status window 2402 to show the user the current status of the application. In one non-exclusive embodiment, the status window 2402 may indicate a locked condition when the alarm has been activated. Along with the status window 2402, a disarm icon 2404 may also be displayed on the device. The disarm icon 2404 may allow the user to disengage the alarm. Finally an alarm notification 2406 may be displayed. The alarm notification 2406 may show the user the type of alarm procedure that is being executed by the application. In one non-exclusive embodiment, the alarm notification 2406 may indicate that the audio/video of the device is being recorded, that certain people have been contacted, and that the position of the device is being tracked through the GPS signal of the device.

Figure 25:
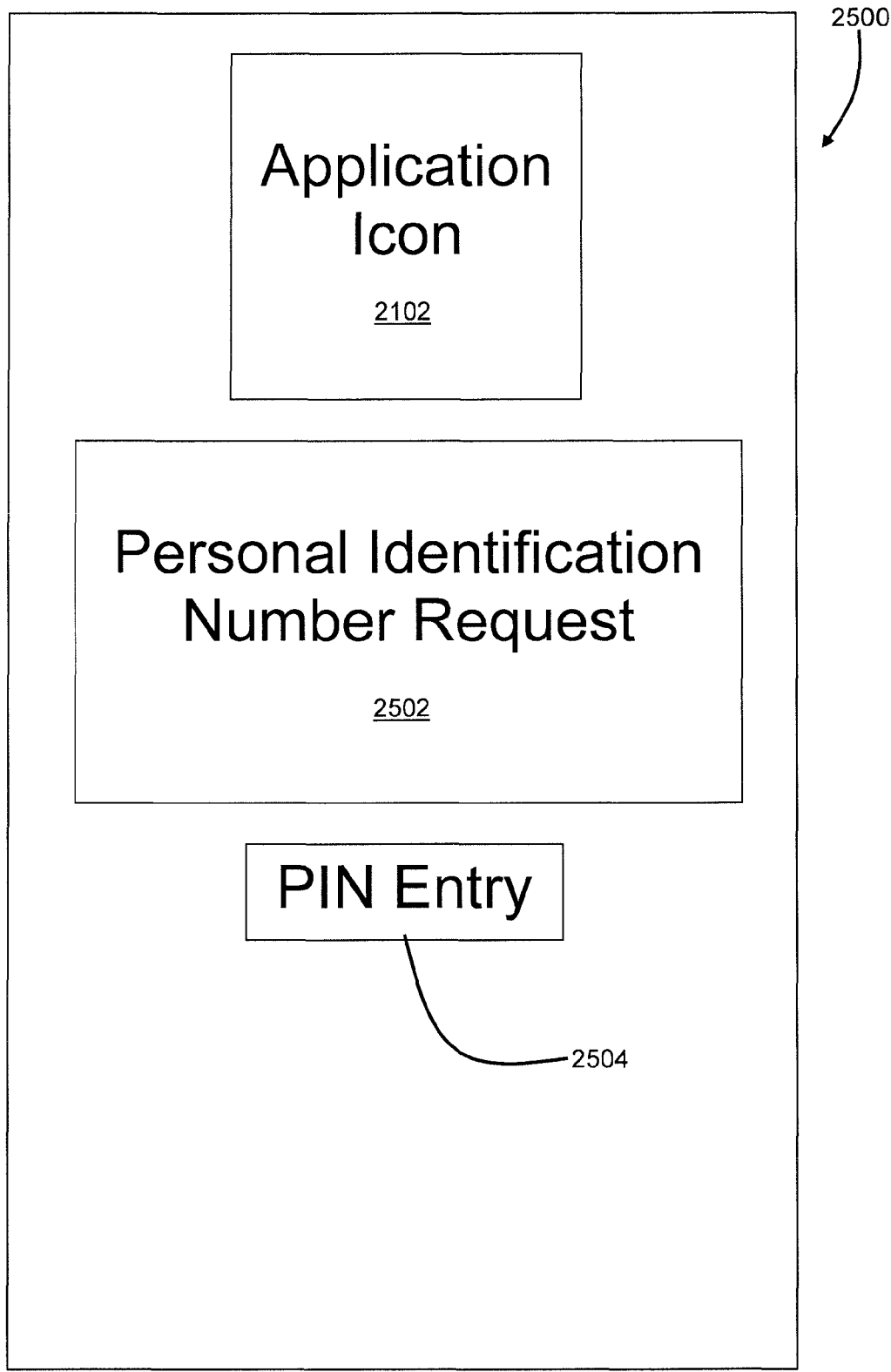
FIG. 25 is a wireframe view of a disarm screen of the application of FIG. 18.

If the disarm icon 2404 is selected, a disarm screen 2500 may be displayed as shown in FIG. 25. The disarm screen 2500 may display a message 2502 requesting the user to input a user specific code or word. Also shown on the disarm screen 2500 may be a user entry window 2504 where the user may enter the user specific word or code. If the user successfully enters the user specific word or code, the application may be disarmed and no longer send the alarm notifications of block 1818.

While exemplary embodiments incorporating the principles of the present disclosure have been disclosed hereinabove, the present disclosure is not limited to the disclosed embodiments. Instead, this application is intended to cover any variations, uses, or adaptations of the invention using its general principles. Further, this application is intended to cover such departures from the present disclosure as come within known or customary practice in the art to which this disclosure pertains and which fall within the limits of the appended claim.

What is claimed is:

1. A multipurpose refuse management system, comprising: a receptacle having an outer shell surrounding internal components; a door assembly coupled to the outer shell, the door assembly being movable between an open position and a close position; a hydraulic lift assembly operably coupled to the internal components; at least one power configuration electrically coupled to a plurality of electrical systems; at least one controller electrically coupled to the power configuration; at least one motor operably coupled to the internal components and electrically coupled to the controller; at least one display coupled to the outer shell and electrically coupled to the controller; and a network interface electrically coupled to the controller; wherein, the door assembly allows a user to distribute refuse into the internal components; further wherein, the network interface provides wireless communication between the user and the refuse management system; and wherein the power configuration comprises: a power source for receiving power from a local power grid; a battery electrically coupled to a system bus; a solar charger electrically coupled to at least one solar cell and the battery; a converter electrically coupled to the power source and the battery, the converter configured to convert the power supplied by the local power grid to the power needed by the system bus; wherein the battery is charged by the power source when the power source is receiving power from the local power grid; further wherein, the battery is charged by the solar cell when the power source is not receiving power from the local power grid.

2. The multipurpose refuse management system of claim 1, wherein the power configuration comprises:
a power source for receiving power from a local power grid;
a converter for converting the power supplied by the local power grid to the power needed by a system bus;
wherein the system bus distributes power to the plurality of electrical systems.

3. The multipurpose refuse management system of claim 1, wherein the power configuration comprises:
at least one solar cell electrically coupled to a solar charger; and
a battery electrically coupled to the solar charger and a system bus;
wherein the solar cell supplies solar energy to the solar charger to charge the battery.

4. The multipurpose refuse management system of claim 1, wherein the internal components comprise:
a receiving assembly coupled to the door assembly;
a basket carrier and a basket, the basket being disposable within the basket carrier;

a pump assembly coupled to the hydraulic lift assembly, the hydraulic lift assembly being operably coupled to the basket carrier; and a mechanism operably coupled to the pump assembly and the door assembly, the mechanism being movable in a first direction wherein, when the mechanism is moved in the first direction the door assembly moves to the open position;

further wherein, when the mechanism is moved in the first direction, hydraulic pressure is generated by the pump assembly.

5. The multipurpose refuse management system of claim 1 further comprising:

a control valve hydraulically coupled to the hydraulic lift assembly and electrically coupled to the controller;

wherein the controller is configured to transition the control valve between a first position and a second position.

6. The multipurpose refuse management system of claim 1, further comprising a GPS device electrically coupled to the controller and configured to identify the location of the receptacle.

7. The multipurpose refuse management system of claim 1, further comprising a camera electrically coupled to the controller, the camera configured to record audio and video information.

8. The multipurpose refuse management system of claim 1, wherein the network interface is adapted to provide access to the internet.

9. The multipurpose refuse management system of claim 1, wherein the network interface is adapted to provide access to a local area network.

* * * * *